United States Patent
Tilton et al.

(10) Patent No.: US 10,722,800 B2
(45) Date of Patent: Jul. 28, 2020

(54) CO-PRESENCE HANDLING IN VIRTUAL REALITY

(71) Applicant: GOOGLE INC., Mountain View, CA (US)

(72) Inventors: Robbie Tilton, San Francisco, CA (US); Robert Carl Jagnow, Mountain View, CA (US); Jon Michael Wiley, San Jose, CA (US); Lauren Levine, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 277 days.

(21) Appl. No.: 15/595,369

(22) Filed: May 15, 2017

(65) Prior Publication Data

US 2017/0326457 A1 Nov. 16, 2017

Related U.S. Application Data

(60) Provisional application No. 62/336,932, filed on May 16, 2016.

(51) Int. Cl.
*A63F 13/75* (2014.01)
*A63F 13/71* (2014.01)
(Continued)

(52) U.S. Cl.
CPC .............. *A63F 13/75* (2014.09); *A63F 13/71* (2014.09); *A63F 13/79* (2014.09); *A63F 13/87* (2014.09);
(Continued)

(58) Field of Classification Search
CPC ....................................................... G06F 17/00
See application file for complete search history.

(56) References Cited

U.S. PATENT DOCUMENTS 5,884,029 A   3/1999   Brush et al.
7,613,569 B2  11/2009  Sherony et al.
(Continued)

FOREIGN PATENT DOCUMENTS

| CN | 102254346 A | 11/2011 |
| WO | 2013181026 A1 | 12/2013 |
| WO | 2016014877 A1 | 1/2016 |

OTHER PUBLICATIONS

Shami et al., "Avatars Meet Meetings: Design Issues in Integrating Avatars in Distributed Corporate Meetings", ACM, pp. 35-44 (Year: 2010).*

(Continued)

*Primary Examiner* — James J Debrow
(74) *Attorney, Agent, or Firm* — Brake Hughes Bellermann LLP

(57) ABSTRACT

A method for controlling a co-presence virtual environment for a first user and a second user includes: determining a first avatar's restricted space in the co-presence virtual environment, the first avatar correspond to the first user of the co-presence virtual environment; receiving user position data from a first computing device associated with the first user and determining the first avatar's location within the co-presence virtual environment; when the first avatar's location is within the first avatar's restricted space, communicating first co-presence virtual environment modification data to the first computing device; and communicating second co-presence virtual environment modification data to a second computing device associated with the second user.

24 Claims, 11 Drawing Sheets

(51) Int. Cl.
*A63F 13/79* (2014.01)
*A63F 13/87* (2014.01)
*H04L 29/06* (2006.01)
*G06F 3/01* (2006.01)
*G06K 9/00* (2006.01)

(52) U.S. Cl.
CPC .............. *G06F 3/011* (2013.01); *G06K 9/00* (2013.01); *G06K 9/00671* (2013.01); *H04L 65/403* (2013.01); *A63F 2300/8082* (2013.01)

(56) References Cited

U.S. PATENT DOCUMENTS

| | | | |
|---|---|---|---|
| 8,077,153 | B2 | 12/2011 | Benko et al. |
| 8,762,043 | B2 | 6/2014 | Eidehall et al. |
| 8,957,835 | B2 | 2/2015 | Hoellwarth et al. |
| 9,152,248 | B1 | 10/2015 | Powers et al. |
| 9,176,325 | B2 | 11/2015 | Lyons |
| 9,183,676 | B2 | 11/2015 | McCulloch et al. |
| 9,274,340 | B2 | 3/2016 | Lyons |
| 9,323,056 | B2 | 4/2016 | Williams |
| 9,377,626 | B2 | 6/2016 | Lyons |
| 9,551,873 | B2 | 1/2017 | Zalewski |
| 9,599,824 | B2 | 3/2017 | Lyons |
| 10,228,773 | B2 | 3/2019 | Lyons |
| 10,302,951 | B2 | 5/2019 | Lyons |
| 2004/0254728 | A1 | 12/2004 | Poropat |
| 2006/0244735 | A1 | 11/2006 | Wilson |
| 2007/0200927 | A1 | 8/2007 | Krenik |
| 2009/0089685 | A1* | 4/2009 | Mordecai et al. ...... G06F 3/048 |
| 2010/0005423 | A1* | 1/2010 | Finn et al. .............. G06F 3/048 |
| 2010/0081508 | A1* | 4/2010 | Bhogal et al. ............ A63F 9/24 |
| 2010/0091377 | A1 | 4/2010 | Hedges et al. |
| 2010/0156909 | A1* | 6/2010 | Banerjee et al. ....... G06T 11/00 |
| 2010/0169798 | A1 | 7/2010 | Hyndman et al. |
| 2010/0286942 | A1 | 11/2010 | Dohta |
| 2011/0128281 | A1 | 6/2011 | Bhogal et al. |
| 2011/0298827 | A1 | 12/2011 | Perez |
| 2012/0026408 | A1 | 2/2012 | Lee et al. |
| 2013/0082963 | A1 | 4/2013 | Chu |
| 2015/0138645 | A1 | 5/2015 | Kim et al. |
| 2015/0234193 | A1 | 8/2015 | Lyons |
| 2015/0234501 | A1 | 8/2015 | Lyons |
| 2015/0331485 | A1 | 11/2015 | Wilairat et al. |
| 2016/0063766 | A1 | 3/2016 | Han et al. |
| 2016/0085403 | A1 | 3/2016 | Koga |
| 2016/0093108 | A1 | 3/2016 | Mao et al. |
| 2016/0239080 | A1 | 8/2016 | Marcolina et al. |
| 2016/0291666 | A1 | 10/2016 | Hosoya et al. |
| 2016/0300387 | A1* | 10/2016 | Zinnan ..................... G06F 3/16 |
| 2016/0341953 | A1 | 11/2016 | Tseng et al. |
| 2017/0011554 | A1* | 1/2017 | Burba et al. .............. G06F 3/14 |
| 2017/0011555 | A1 | 1/2017 | Li et al. |
| 2017/0025097 | A1 | 1/2017 | Kuribayashi et al. |
| 2017/0115839 | A1 | 4/2017 | Park et al. |
| 2017/0161951 | A1 | 6/2017 | Fix et al. |
| 2017/0243327 | A1 | 8/2017 | Zhang et al. |
| 2018/0130227 | A1 | 5/2018 | Sato et al. |
| 2019/0155405 | A1 | 5/2019 | Lyons |

OTHER PUBLICATIONS

International Search Report and Written Opinion received for PCT Patent Application No. PCT/US2017/032843, dated Aug. 1, 2017, 11 pages.
International Preliminary Report on Patentability for PCT Application PCT/US2017/032843, dated Aug. 2, 2018, 35 pages.
Written Opinion for International Application PCT/US2017/032843, dated Apr. 20, 2018, 8 pages.
Friedman, et al., "Spatial Social Behavior in Second Life", LNCS, vol. 4722, 2007, 12 pages.
Metz, Rachel, "How to Avoid Real Objects While in a Virtual World", MIT Technology Review, Jun. 12, 2015, 8 pages.
Robertson, "The second HTC Vive development kit has a built-in camera and new controllers", retrieved on May 4, 2016 from http://www.theverge.com/2016/1/5/10714522/htcvalvevive prev2developmentkitces2016, Jan. 5, 2016, 7 pages.
Shanklin, "HTC Vive Pre handson: Chaperone system means less chance of smacking into things", retrieved on May 4, 2016 from http://www.gizmag.com/htcviveprereviewhandson/41182/, Jan. 5, 2016, 8 pages.
Volpe, "HTC's making virtual reality safe for the home with Chaperone", retrieved on May 4, 2016 from http://www.engadget.com/2016/01/05/htcvivevirtualrealitychaperone/,Jan. 5, 2016, 15 pages.
Wilcox, et al., "Personal space in virtual reality", ACM Transactions on Applied Perception (TAP), vol. 3, Issue 4, Oct. 2006, pp. 412-428.

* cited by examiner

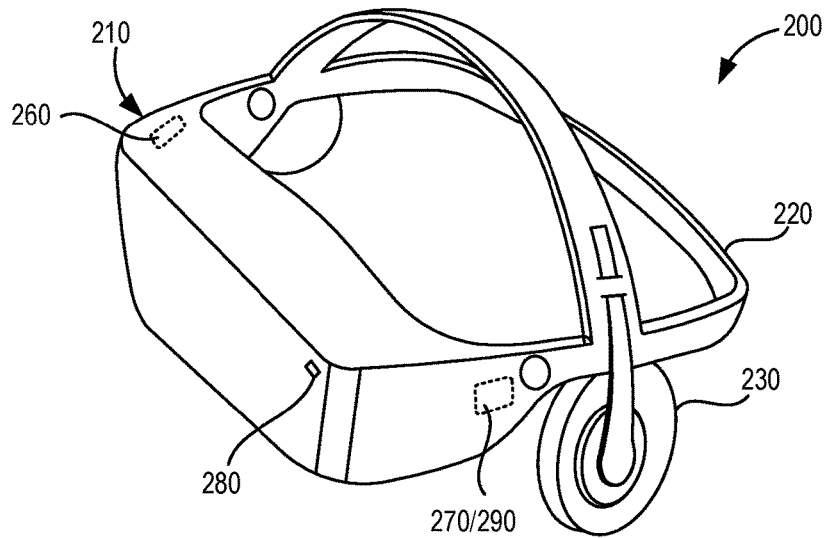
FIG. 2A
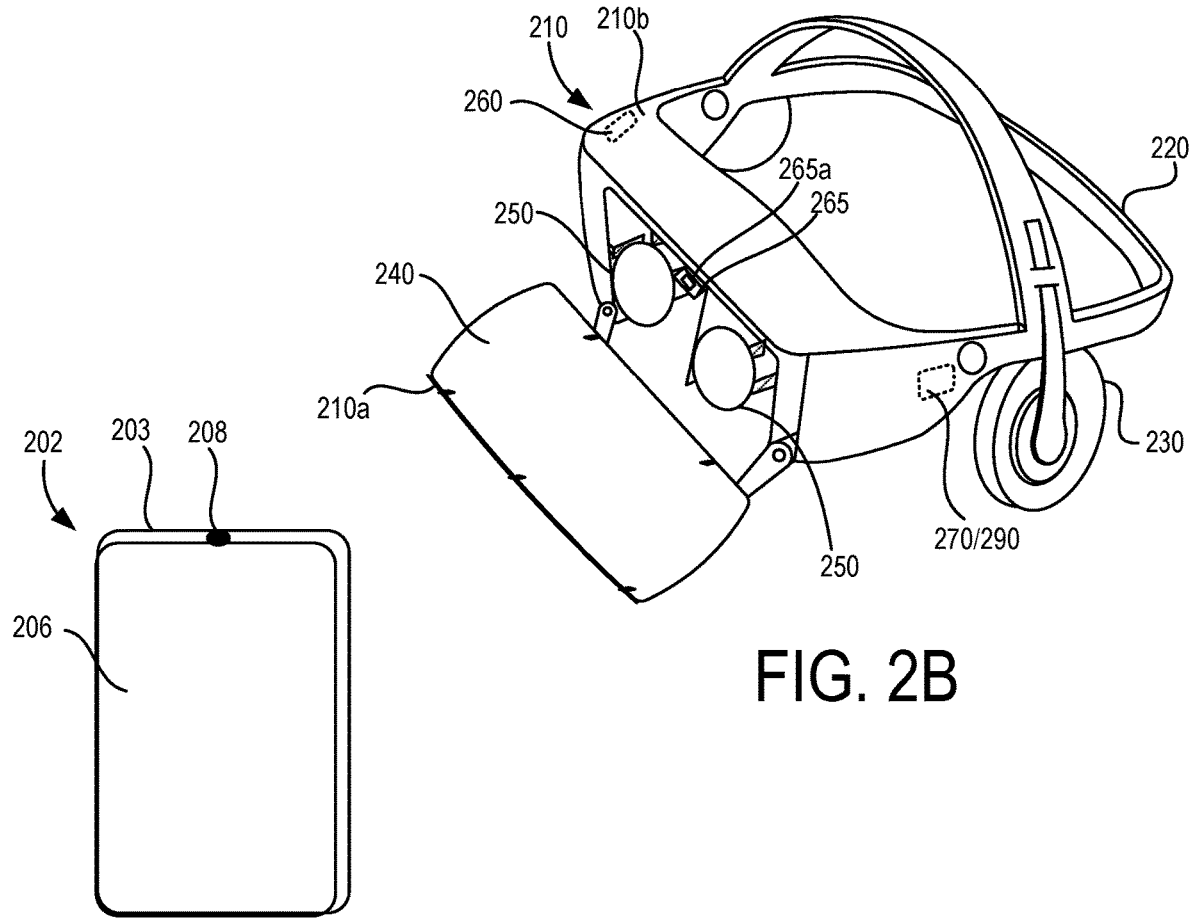
FIG. 2B
FIG. 2C

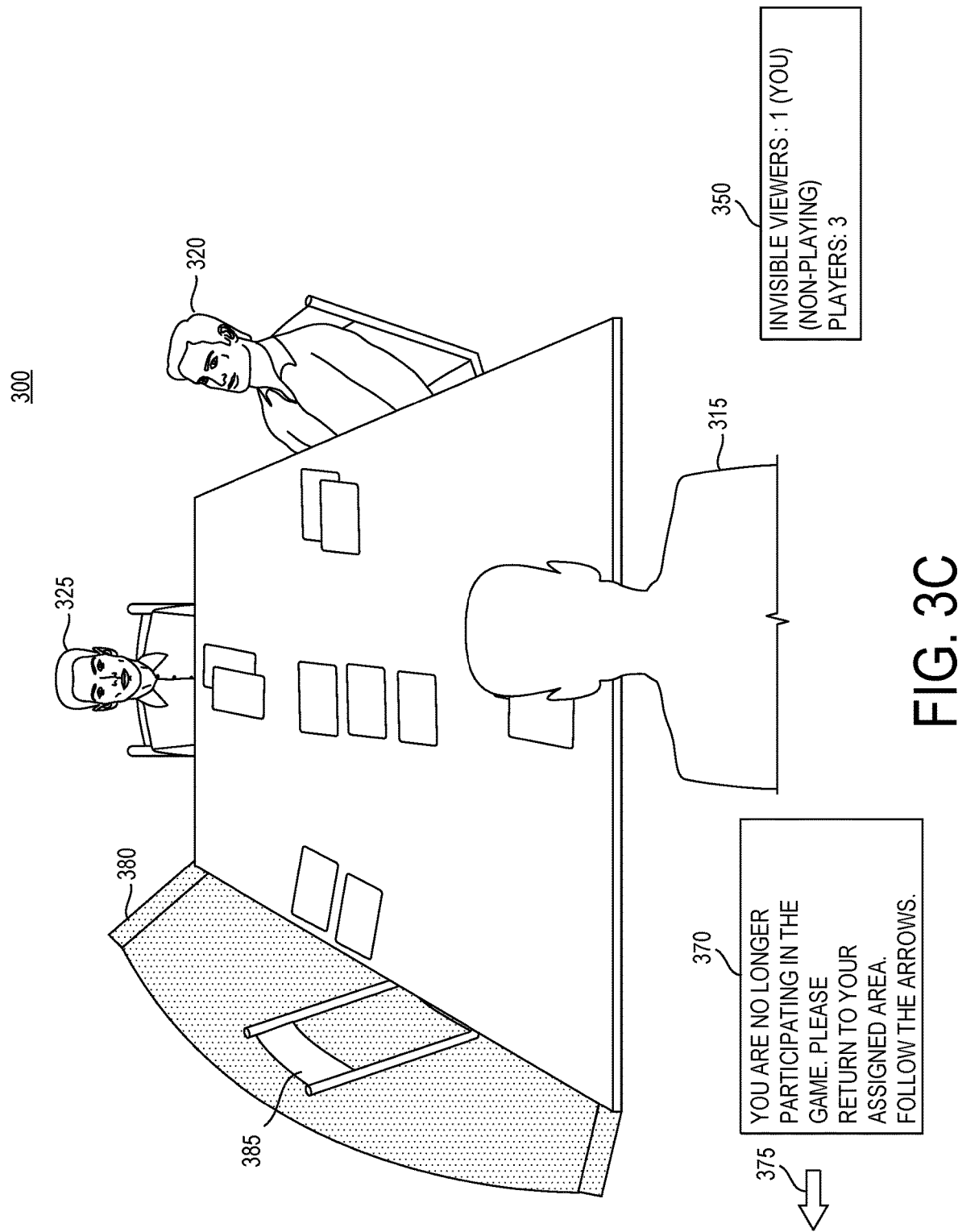

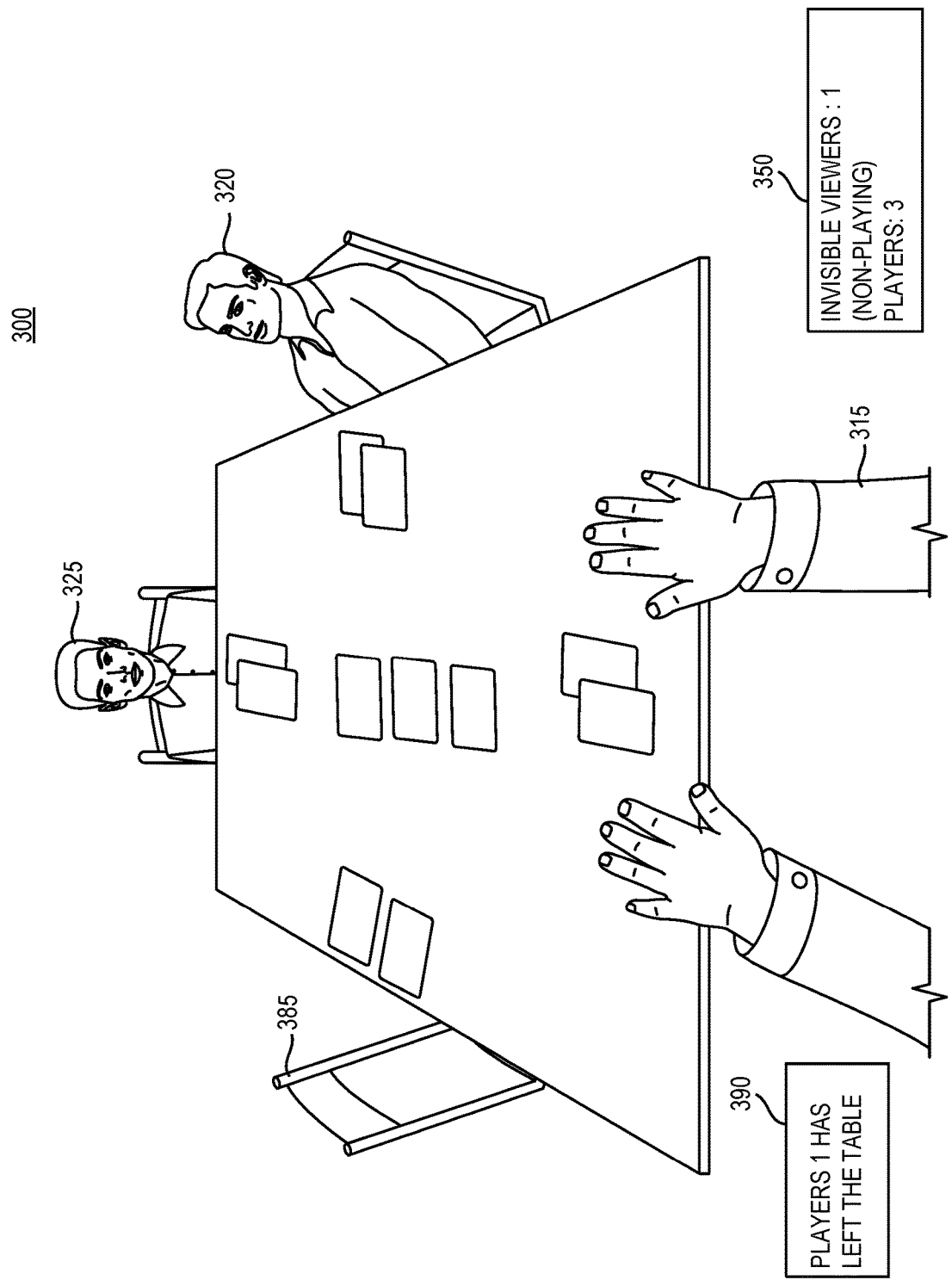

CO-PRESENCE HANDLING IN VIRTUAL REALITY

CROSS-REFERENCE TO RELATED APPLICATION

This application claims priority to U.S. Provisional Application No. 62/336,932, entitled CO-PRESENCE HANDLING IN VIRTUAL REALITY and filed on May 16, 2016, the contents of which are hereby incorporated herein by reference.

TECHNICAL FIELD

This document relates to graphical user interfaces for computer systems and, in particular, to Virtual Reality (VR) displays for use in VR and related applications.

BACKGROUND

A virtual reality (VR) system can generate a three-dimensional (3D) immersive virtual environment. A user can experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the 3D virtual environment, the user can move through the virtual environment and move to other areas of the virtual environment, through physical movement and/or manipulation of an electronic device to interact with the virtual environment and personalize interaction with the virtual environment.

In a co-presence virtual environment more than one user inhabits the virtual environment. Users see virtual representations, or avatars, of the other players in the co-presence virtual environment. Users in a co-presence virtual environment can interact with avatars similar to how users interact with people in the real world. For example, a user can move close to an avatar, touch the avatar, talk to the avatar or gesture toward the avatar to communicate as they would a live person. Co-presence can enhance the realism of virtual environments and provide experiences that might not be available to users in the real world.

SUMMARY

In one aspect, a method for controlling a co-presence virtual environment for a first user and a second user includes determining a first avatar's restricted space in the co-presence virtual environment. The first avatar can correspond to the first user of the co-presence virtual environment. The method receives user position data from a first user computing device associated with the first user and determines the first avatar's location within the co-presence virtual environment. When the first avatar's location is within the first avatar's restricted space, the method communicates first co-presence virtual environment modification data to the first user computing device. The method also communicates second co-presence virtual environment modification data to a second user computing device associated with the second user. According to some implementations, the first co-presence virtual environment modification data is different from the second co-presence virtual environment data.

In some implementations, the first avatar's restricted space can be defined based on the context of the co-presence virtual environment, a region within the co-presence virtual environment, and/or by safe spaces that have been defined by one or more other users of the co-presence virtual environment. Further, the first co-presence virtual environment modification data can include instructions for the first user computing to device to change the color scheme of the co-presence virtual environment or to change the audio stream associated with the co-presence virtual environment generated by the first user computing device. The first co-presence virtual environment modification data can also include instructions for generating graphic indicators that can instruct the user to exit the first avatar's restricted space. The first co-presence virtual environment modification data can also include instructions for the first user computing device to render a notification showing the quantity of other avatars not visible in the co-presence virtual environment and the quantity of other users for which the method provides co-presence virtual environment modification data.

In some implementations, the second co-presence virtual environment modification data can include instructions for the second user computing device to make the first avatar invisible, or a portion of the first avatar invisible, in the second user computing device's rendering of the co-presence virtual environment. The second co-presence virtual environment modification data can also include instructions to mute the audio of the first avatar in the audio stream associated with the co-presence virtual environment generated by the second user computing device. The second co-presence virtual environment modification data can also include instructions for the first user computing device to render a notification showing the quantity of other avatars not visible in the co-presence virtual environment and the quantity of other users for which the method provides co-presence virtual environment modification data.

In some implementations, when the first avatar's location is within the first avatar's restricted space, the method can reposition the first avatar outside of the restricted space but within the co-presence virtual environment without receiving user position data indicating that the first user changed the location of the first avatar. In such implementations, the method can communicate updated location data to the first user computing device reflecting the first avatar's location after repositioning. In some implementations, the method can remove the first avatar from the co-presence virtual environment and in such implementations, the first co-presence virtual environment modification data can include instructions for the first user computing device to render an alternative virtual environment different from the co-presence virtual environment and place the user within in it.

Other embodiments of this aspect include corresponding computer systems, apparatus, and computer programs recorded on one or more computer storage devices, each configured to perform the operations of the method summarized above.

In another aspect, a method for rendering a co-presence virtual environment includes communicating a message requesting to join a co-presence virtual environment, the message including initial user position data associated with a virtual reality user device. The method can also include communicating current user position data responsive to movement of the virtual reality user device. The method can receive virtual environment modification data and applying the received virtual environment modification data to a rendering of the co-presence virtual environment associated with the virtual reality user device.

In some implementations, the initial user position data includes initial location and orientation data of the virtual reality user device and the current user position data includes current location and orientation data of the virtual reality user device. In some implementations, the initial user position data includes the initial location information associated with an avatar participating in the co-presence virtual environment when the avatar joins the co-presence virtual environment and the current location data includes current location information associated with an avatar participating in the co-presence virtual environment.

In some implementations, the virtual environment modification data can include instructions to modify the color of the co-presence virtual environment or modify the audio generated by the virtual reality user device while rendering the co-presence virtual environment. In some implementations, the virtual environment modification data can include instructions to make invisible one or more avatars, or on portions of one or more avatars, within the co-presence virtual environment. The virtual environment modification data can also include instructions for rendering a notification overlay on top of the rendering of the co-presence virtual environment, the notification overlay showing the quantity of avatars not visible in the co-presence virtual environment and the quantity of users having visual access to the co-presence virtual environment.

Other embodiments of this aspect include corresponding computer systems, apparatus, and computer programs recorded on one or more computer storage devices, each configured to perform the operations of the method summarized above.

The details of one or more embodiments are set forth in the accompanying drawings and the description below. Other features will be apparent from the description and drawings.

BRIEF DESCRIPTION OF THE DRAWINGS

FIG. 2A shows a perspective view of an example head mounted display consistent with disclosed embodiments.

FIG. 2B shows another perspective view of an example head mounted display consistent with disclosed embodiments.

FIG. 2C shows a perspective view of a mobile device consistent with disclosed embodiments.

FIG. 3C shows another example co-presence virtual environment consistent with disclosed embodiments.

FIG. 3D shows another example co-presence virtual environment consistent with disclosed embodiments.

Like reference symbols in the various drawings indicate like elements.

DETAILED DESCRIPTION

Figure 1A:
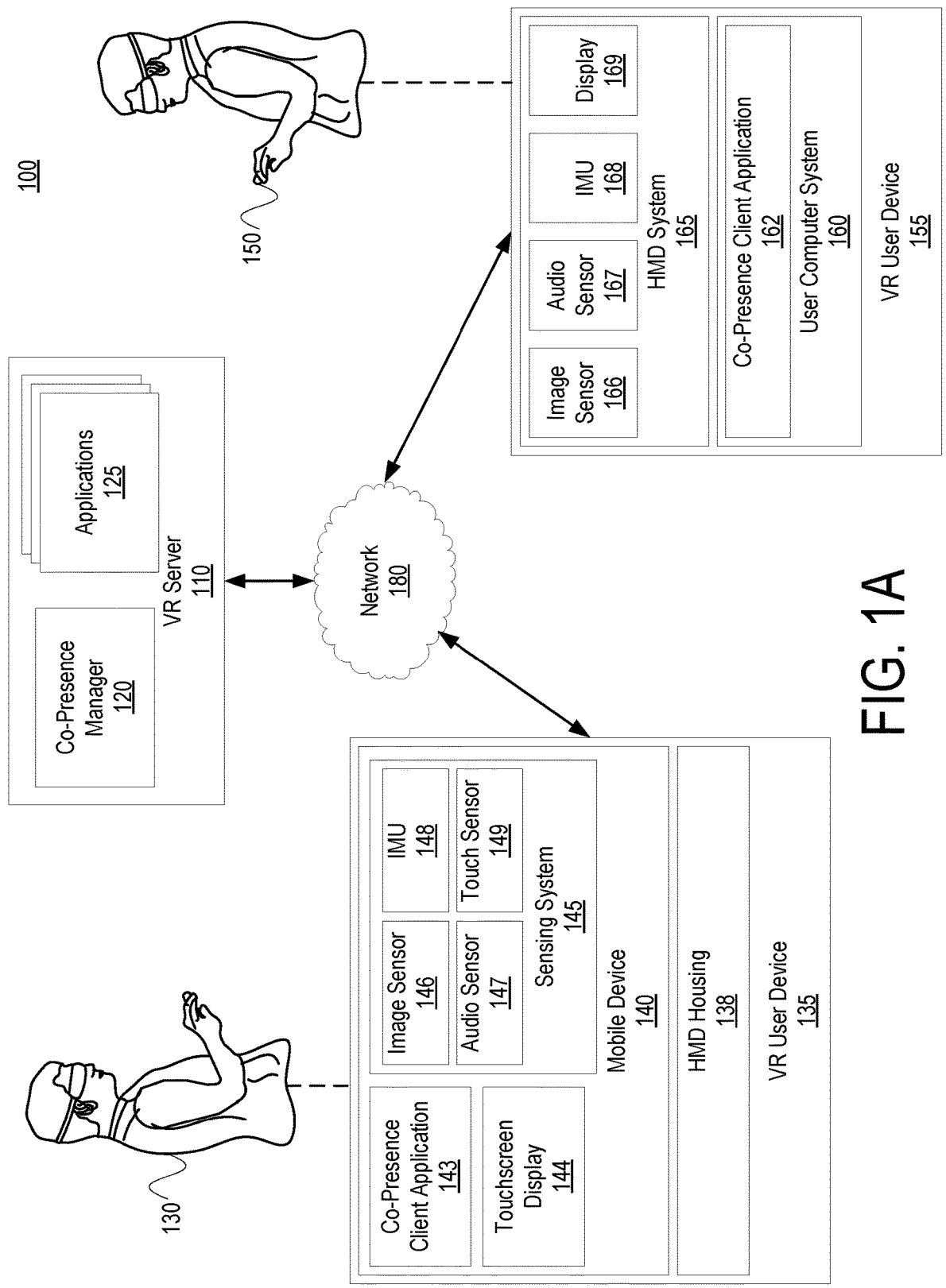
FIG. 1A shows an example co-presence virtual environment system consistent with disclosed embodiments.

Although co-presence virtual environments provide the benefit of giving users interactive experiences that the users may not have in the real world, some users may take advantage of co-presence virtual environments and engage in behavior that they normally would not in the real world. Such behavior can include unauthorized contact, invading the personal space of other users, cheating on games, or any other type of behavior that would not normally be tolerated in the real world or in which a user many not engage due to social norms and societal pressures. For example, in a co-presence virtual environment, a user may walk up to another avatar and physically assault the avatar or, as another example, a user can cheat in a card game by leaving her seat and looking over another avatar's shoulder at the avatar's cards. As another example, in a co-presence virtual environment where users are dancing, a user may get too close to another avatar, which may make the user of that avatar uncomfortable. Due in part to the anonymity of co-presence virtual environments, users may find it easier to engage in such behavior, which can discourage other users from participating in co-presence virtual environments.

Accordingly, the disclosed embodiments handle behavior in co-presence virtual environments. In some embodiments, a co-presence manager defines restricted spaces for users in the co-presence virtual environment and provides co-presence virtual environment modification data to users' computing devices instructing them to change the way they are rendering the co-presence virtual environment. The co-presence manager maintains data related to the co-presence virtual environment that can include the size of the co-presence virtual environment, the location and size of objects within the co-presence virtual environment, the location of each user within the co-presence virtual environment, and the restricted space for each user's avatar within the co-presence virtual environment.

Restricted space can be defined based on distances from objects within the co-presence virtual environment, and vary from application to application. In some embodiments, restricted spaces are defined by a spherical radius from the space an object occupies within the co-presence virtual environment. For example, in a fantasy, exploration, co-presence virtual environment application, users may not be able to get closer than two meters to a lake, and in that implementation, the restricted space would include all points that are within a two meter radius from the set of points occupied by the lake.

Restricted spaces can also include the inverse of a permitted space, where permitted space can be similarly defined by a spherical radius from the points an object occupies within the co-presence virtual environment. For example, in a card game co-presence virtual environment application, permitted space might include a one meter radius from the points occupied by a user's chair at a card table. In such an embodiment, restricted space would include all points in the co-presence virtual environment but those points falling within a one meter radius from user's chair.

In some embodiments, users of co-presence virtual environments can define safe spaces around their avatar to prevent other avatars from getting too close to them, and safe spaces can further define the restricted space for a given avatar in the co-presence virtual environment. For example, a user can define a safe space of 0.25 m, and any avatar entering the region within 0.25 m of any point of the user's avatar would enter restricted space. In that manner, the accessibility and visibility of information in the virtual space within the safe space may be hindered or prevented for other avatars and the respective users. In other words, a safe space of a user can restrict the ability of the user of another avatar from taking one or more actions with regard to the safe space. For example, the safe space can prevent or restrain the other avatar from moving near the avatar. In some embodiments, safe spaces can vary in size (e.g., volume) depending on the user's body part. For example, safe spaces around a user's hands may be smaller than safe spaces around the user's face. In some embodiments, user's can define safe spaces on an application basis. For example, users can define a first set of safe spaces in a co-presence virtual environment for a fighting simulation, and second set of safe spaces in a co-presence virtual environment for business meetings. Further, users can define a global set of safe space preferences that define a user's default safe space if the user has not overridden them for a specific co-presence virtual environment application. In some embodiments, a co-presence manager component receives safe space data corresponding to a user when the user's computing device joins the co-presence virtual environment managed by the co-presence manager. When the co-presence manager receives the safe space data, it can further define the restricted space for the other users participating in the co-presence virtual environment.

As mentioned above, when the co-presence manager detects that a user has moved their avatar into the avatar's restricted space, the co-presence manager can communicate co-presence virtual environment modification data to the computing devices of the users participating in the co-presence virtual environment. The co-presence virtual environment modification data can include instructions for changing the appearance of the co-presence virtual environment for a user whose avatar (or a portion thereof) enters the avatar's restricted space. For example, the virtual environment may turn from color to black and white when the user enters restricted space or the audio associated with the virtual environment may be distorted, muffled, or muted. In some embodiments, the co-presence manager provides co-presence virtual environment modification data that changes the location of the user and the user's avatar responsive to the user entering restricted space. For example, when entering a restricted space the co-presence manager can relocate the user outside of the restricted space but within the co-presence virtual environment, or the co-presence manager can remove the user and its avatar from the co-presence virtual environment entirely by placing them in alternative virtual environment.

The co-presence virtual environment modification data can also include instructions for changing the appearance of the co-presence virtual environment for the other users of the co-presence virtual environment (i.e., those users whose avatars have not entered restricted space). For example, when a first user's avatar enters restricted space, the co-presence virtual environment modification data can include instructions to change the appearance of the first user's avatar. The appearance change can include, for example, making the first user's avatar, or a portion of the first user's avatar, invisible. The appearance change can alternatively include, for example, rendering the first user's avatar in outline form, dotted outline form, as translucent (e.g., 75% transparent), in a different color, or by changing the size of the first user's avatar. The co-presence virtual environment modification data can also include instructions to modify a portion of the first user's avatar as opposed to the entirety of the first user's avatar. For example, in some embodiments, the co-presence virtual environment modification data can include instructions to change the appearance of the portions of the first user's avatar that encroached restricted space.

FIG. 1A shows one embodiment of virtual reality computer system 100 configured to provide a co-presence virtual environment for users 130 and 150. In one embodiment, virtual reality computer system 100 can include virtual reality server 110, virtual reality user device 135 and virtual reality user device 155. As shown in FIG. 1A, user 130 operates virtual reality user device 135 and user 150 operates virtual reality user device 155 to participate in a co-presence virtual environment. In some embodiments, virtual reality user device 135 and virtual reality user device 155 can communicate with virtual reality server 110 over network 180. Although the embodiment depicted in FIG. 1A shows two users operating virtual reality user devices to communicate with virtual reality server 110, in other embodiments more than two virtual-reality user devices can communicate with virtual-reality server 110 allowing more than two users to participate in a co-presence virtual environment.

In some embodiments, virtual-reality server 110 is a computing device such as, for example, computer device 700 shown in FIG. 7 described below. Virtual-reality server 110 can include software or firmware providing the operations and functionality for co-presence manager 120 and one or more applications 125.

In some embodiments, applications 125 can include server-side logic and processing for providing a game, service, or utility in a co-presence virtual environment. For example, applications 125 can include server-side logic and processing for a card game, a dancing game, a virtual-reality business meeting application, a shopping application, a virtual sporting application, or any other application that may be provided in a co-presence virtual environment. Applications 125 can include functions and operations that communicate with client-side applications executing on virtual-reality user devices. Using the example embodiment of FIG. 1A, applications 125 can include functions and operations that communicate with co-presence client application 143 executing on VR user device 135, and/or co-presence client application 162 executing on VR user device 155.

According to some embodiments, applications 125 executing on virtual reality server 110 can interface with co-presence manager 120 to manage co-presence virtual environments. In some embodiments, such interfacing can occur via an API exposed by co-presence manager 120. Co-presence manager 120 can, in some embodiments, perform functions and operations that manage restricted spaces and permitted spaces for avatars corresponding to users 130, 150 in the co-presence virtual environment. According to some embodiments, co-presence manager 120 manages the restricted spaces and permitted spaces by maintaining information concerning the size and shape of the co-presence virtual environment, the objects within the co-presence virtual environment, and the avatars within the co-presence virtual environment. Although co-presence manager 120 is depicted in FIG. 1A as a separate functional component from applications 125, in some embodiments, one or more of applications 125 can perform the functions and operations co-presence manager 120.

For example, co-presence manager 120 can include a data structure storing points representing the space of co-presence virtual environment. The points stored in the data structure can include x, y, z, coordinates, for example. Co-presence manager 120 can also include a data structure storing information about the objects in the co-presence virtual environment, and the information can include the set of points occupied by the objects in co-presence virtual environment. For example, when the co-presence virtual environment is a virtual card game occurring in a virtual game room, co-presence manager 120 can include a data structure storing the set of points representing each point of space in the virtual game room. Co-presence manager 120 can also include a data structure storing objects representing a card table, cards, chairs, and avatars participating in the virtual card game. The data structure can include information identifying the points within the co-presence virtual environment occupied by the card table, the cards, chairs, and avatars.

In some embodiments, restricted spaces can include the set of points that are a certain radius from an object. For example, a co-presence virtual environment can include an object to which no avatar is allowed to get closer than what a user perceives to be 1 m in the co-presence virtual environment. In such an example, co-presence manager 120 can define a restricted space as the set of points equal to 1 m of perceived space in the co-presence virtual environment from the object, thereby creating a radius around the object for which no avatar is permitted to encroach. Co-presence manager 120 can then associate the restricted space around the object for each avatar participating in the co-presence virtual environment.

Restricted spaces can also be defined to include safe spaces. Safe spaces are restricted spaces defined by users of the co-presence virtual environment with respect to their avatars. For example, a user may define a safe space of 0.25 m around their avatar. Co-presence manager 120 can define a restricted space that includes the set of points corresponding to 0.25 m (of perceived distance in the co-presence virtual environment) from the avatar, thereby creating a radius around the avatar for which no other avatar in the co-presence virtual environment is permitted to encroach. Since safe spaces are defined with respect to an avatar, and avatars can move within the co-presence virtual environment, co-presence manager 120 can redefine the restricted space corresponding to the user-defined safe space based on the movement of the avatar associated with the safe space.

Restricted spaces can also be defined based on permitted spaces. Conceptually, permitted spaces are the inverse of restricted spaces as they are spaces in which an avatar is permitted to encroach. In some embodiments, permitted spaces are defined similar to restricted spaces. For example, permitted spaces can include the set of points within a particular radius from the space occupied by an object in the co-presence virtual environment. In one example implementation, VR server 110 may host a virtual card game. To prevent cheating during the virtual card game, application 125—providing the logic and processing for the virtual card game—can define a permitted space of 3 m around a chair in which the avatar sits during the virtual card game. Co-presence manager 120, using this definition of permitted space, can define a restricted space of the entire co-presence virtual environment except for the space occupied by the chair and the set of points that fall within 3 m from the space occupied by the chair. Co-presence manager 120 can monitor the movements of avatars controlled by user 130 and 150 and if either avatar enters their respective restricted space, co-presence manager 120 can generate co-presence virtual environment modification data as described in more detail below.

In some embodiments, co-presence manager 120 can determine the location of an avatar within the co-presence virtual environment, and determine whether the avatar's location falls within a restricted space for that avatar. When co-presence manager 120 determines an avatar is within its restricted space, co-presence manager 120 can generate co-presence virtual environment modification data that can provide instructions to co-presence client applications (such as co-presence client application 143, 162) executing on virtual-reality user devices to modify the rendering of the co-presence virtual environment. The co-presence virtual environment modification data can include, in some embodiments, instructions to change the color of the co-presence virtual environment, the audio associated with the co-presence virtual environment, the appearance of one or more avatars within the co-presence virtual environment, and one or more notification overlays that provide information to users of the co-presence virtual environment.

For example, co-presence manager 120 may determine that an avatar associated with user 130 has entered its restricted space. In response, co-presence manager 120 can generate co-presence virtual environment modification data that instructs co-presence client application 143 to change the rendering of co-presence virtual environment from color to black-and-white. By changing the co-presence virtual environment displayed by VR user device 135, user 130 can be provided with notice that its avatar has entered restricted space. Co-presence manager 120 can also generate co-presence virtual environment modification data that instructs co-presence client application 162 to change the rendering of user 130's avatar from visible to invisible. By changing the co-presence virtual environment displayed by VR user device 155, user 150 can be provided with notice that user 130's avatar has entered restricted space.

As shown in FIG. 1A, user 130 operates VR user device 135. VR user device 135 can include head-mounted display (HMD) housing 138 and mobile device 140. In some embodiments, mobile device 140 can be placed into HMD housing 138 to create VR user device 135, as described in more detail below with respect to FIG. 2. In such embodiments, mobile device 140 provides the processing required to execute co-presence client application 143 and render the co-presence virtual environment for VR user device 135 for use by user 130.

According to some embodiments, mobile device 140 can include sensing system 145 which can including image sensor 146, audio sensor 147, such as is included in, for example, a camera and microphone, inertial measurement unit 148, touch sensor 149 such as is included in a touch sensitive surface of a handheld electronic device, or smartphone, and other such sensors and/or different combination (s) of sensors. In some embodiments, co-presence client application 143 may communicate with sensing system 145 to determine the location and orientation of VR user device 135.

In some embodiments, mobile device 140 can include co-presence client application 143. Co-presence client application 143 can include client logic and processing for providing a game, service, or utility in the co-presence virtual environment. In some embodiments, co-presence client application 143 can include logic and processing for instructing VR user device to render a co-presence virtual environment. For example, co-presence client application 143 may provide instructions to a graphics processor of mobile device 140 (not shown) for rendering the co-presence virtual environment. In some embodiments, co-presence client application 143 can communicate with one or more applications 125 executing on VR server 110 to obtain information about the co-presence virtual environment. For example, co-presence client application may receive data that can be used by mobile device 140 to render the co-presence virtual environment. In some embodiments, co-presence client application 143 can communicate with applications 125 to receive co-presence virtual environment modification data which co-presence client application 143 can use to change how VR user device 135 displays co-presence virtual environment.

According to some embodiments, the co-presence client application can provide information to applications 125 and co-presence client application 143 may then communicate that position and orientation information to applications 125. In some embodiments, co-presence client application may communicate input data received by mobile device 140, including image data captured by image sensor 146, audio data captured by audio sensor 147, and/or touchscreen events captured by touch sensor 149. For example, in some embodiments HMD housing 138 can include a capacitive user input button that when pressed registers a touch event on touchscreen display 144 of mobile device 140 as if user 130 touched touchscreen display 144 with a finger. In such an example, co-presence client application 143 may communicate the touch events to applications 125.

In another example, image sensor 146 of mobile device 140 may capture body part motion of user 130, such as motion coming from the hands, arms, legs or other body parts of user 130. Co-presence client application 143 may render a representation of those body parts on touchscreen display 144 of mobile device 140, and communicate data regarding those images to applications 125. Applications 125 can then provide co-presence virtual environment modification data to co-presence client application 162 so that co-presence client application 162 can render an avatar corresponding to user 130 using the captured body movements.

As shown in FIG. 1A, user 150 operates VR user device 155. VR user device 155 can include HMD system 165 and user computer system 160. In some embodiments, VR user device 155 may differ from VR user device 135 in that HMD system 165 includes a dedicated image sensor 166, audio sensor 167, IMU 168, and display 169, while VR user device 135 incorporates a general-purpose mobile device 140 (such as mobile device 782 shown in FIG. 7, for example) for its image sensor 146, audio sensor 147, IMU 148, and display 144. VR user device 155 may also differ from VR user device 135 in that HMD system 165 can be connected as a peripheral device in communication with user computer system 160, which can be a general purpose personal computing system (such as laptop computer 722). However, the functionality of the like-named components of VR user device 155 can be the same as the like-named components of VR user device 135. For example, co-presence client application 162 may perform the same functionality as co-presence client application 143 in some embodiments. But, in some embodiments, co-presence client application 162 may differ from co-presence client application 143 in that co-presence client application 162 may be configured to execute within the operating system of mobile device 140 which can be different than the operating system of user computer system 160.

While FIG. 1A shows VR user devices of different hardware configurations, in other implementations, the VR user devices communicating with VR server 110 can have the same or similar hardware configurations. For example, the VR user devices may be similar to VR user device 135 where a general-purpose mobile device is disposed within an HMD housing, or the VR user devices may be similar to VR user device 155 where a dedicated HMD system communicates with a general-purpose user computer system.

Figure 1B:
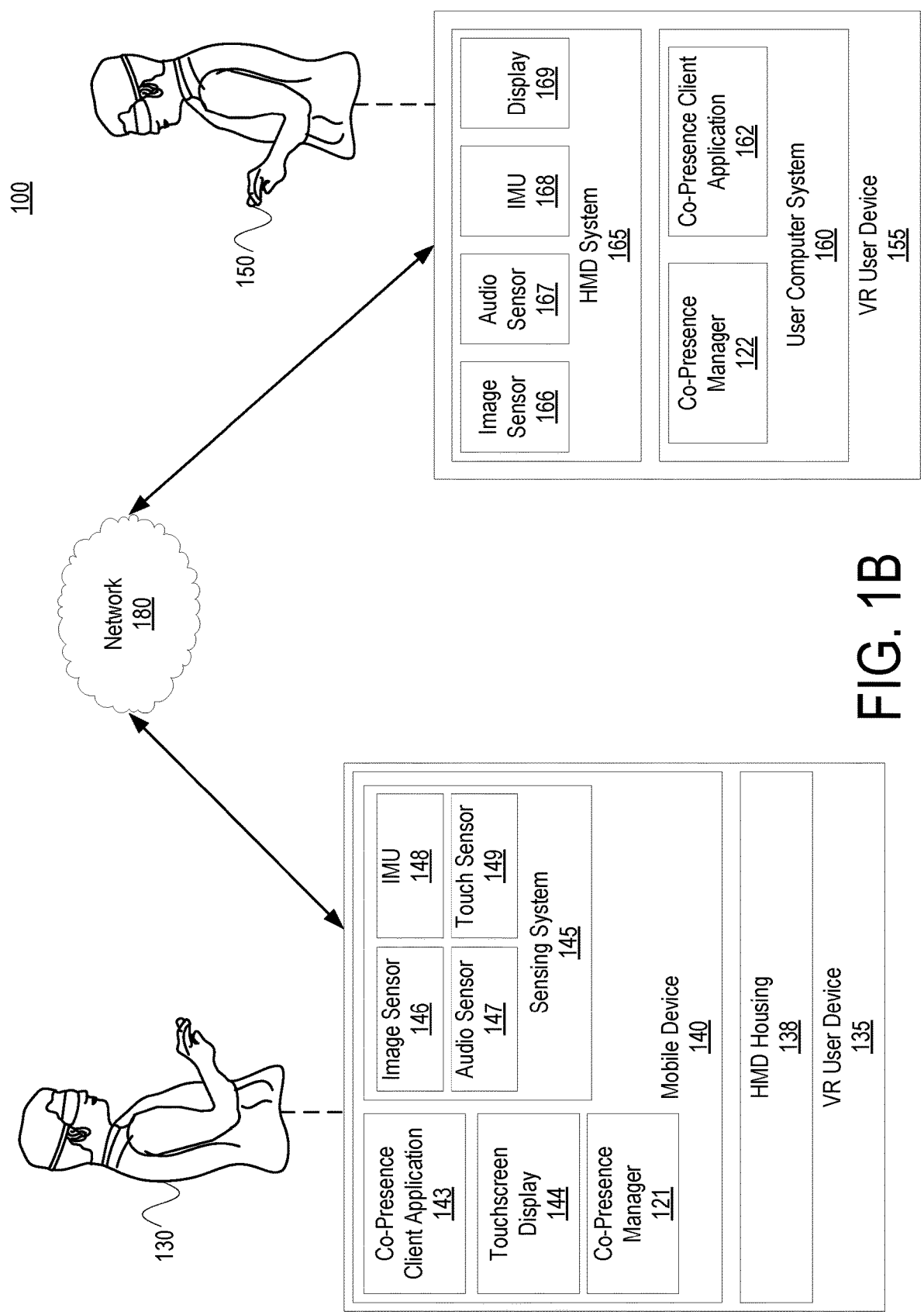
FIG. 1B shows another example co-presence virtual environment system consistent with disclosed embodiments.

FIG. 1B shows another embodiment of virtual-reality computing system 100. In the embodiment of FIG. 1B, VR user device 135 and VR user device 155 communicate directly as opposed to through VR server 110. In such embodiments, the logic and processing performed by the components of VR server 110 may be performed by one of VR user device 135 or VR user device 155, that is, one of VR user device 135 or VR user device 155 acts as a VR server. In another embodiment, the logic and processing performed by the components of VR server 110 may be shared by both VR user device 135 or VR user device 155.

As shown in the embodiment of FIG. 1B, VR user device 135 includes an instance of co-presence manager 121 and VR user device 155 includes an instance of co-presence manager 122. Co-presence manager 121 and co-presence manager 122 can perform, in some embodiments, the same or similar functionality as co-presence manager 120 as described above. According to some embodiments, when VR user device 135 and VR user device 155 participate in a co-presence virtual environment, one of co-presence manager 121 or co-presence manager 122 may perform the same operations as co-presence manager 120. For example, in one embodiment co-presence manager 121 may perform the operations described above with respect to co-presence manager 120 while co-presence manager 122 may be inactive, or alternatively, co-presence manager 122 may perform the operation described above with respect to co-presence manager 120 what co-presence manager 121 remains inactive. Also, in the embodiment of FIG. 1B, co-presence client application 143 and co-presence client application 162 may perform the operations of applications 125 described above.

FIGS. 2A and 2B are perspective views of an example HMD, such as, for example, HMD housing 138 worn by user 130 in FIGS. 1A and 1B, and FIG. 2C illustrates an example handheld electronic device, such as, for example, mobile device 140 in FIGS. 1A and 1B.

Handheld electronic device 202 may include a housing 203 in which internal components of device 202 are received, and touchscreen 206 on an outside of housing 203, accessible to the user. Touchscreen 206 can include a touch sensitive surface configured to receive user touch inputs; handheld electronic device 202 can also include other components for manipulation by the user such as, for example, actuation buttons, knobs, joysticks and the like. In some embodiments, at least a portion of touchscreen 206 can be configured to display user interface items to the user, and also to receive touch inputs from the user. According to some embodiments, touchscreen 206 can be configured by, for example, co-presence client application 143 to render a co-presence virtual environment.

HMD 200 can include housing 210 coupled to frame 220, with an audio output device 230 including, for example, speakers mounted in headphones, that can also be coupled to frame 220. In FIG. 2B, front portion 210a of housing 210 is rotated away from base portion 210b of housing 210 so that handheld electronic device 202 can be disposed within HMD 200. In some embodiments, handheld electronic device 202 can be mounted on an interior facing side of front portion 210a of housing 210 so that touchscreen 206 can be viewed using lenses 250. Lenses 250 can be mounted in housing 210, between the user's eyes and touchscreen 206 when the front portion 210a is in the closed position against the base portion 210b of housing 210. In some embodiments, HMD 200 can include a dedicated display disposed on front portion 210a. In such embodiments, the dedicated display can be controlled by a co-presence client application executing by a processor within HMD 200 (e.g., processor 290 discussed below), or a co-presence client application executing by a processor external to HMD 200 (e.g., user computer system 160).

In some embodiments, HMD 200 can include sensing system 260 including various sensors and a control system 270 including a processor 290 and various control system devices to facilitate operation of the HMD 200. In such implementations, sensing system 260 can operate in conjunction with the sensing system of handheld electronic device 202 to provide location and orientation data to a co-presence client application and/or co-presence manager. In some embodiments, sensing system 260, control system 270, and processor 290 can operate to provide location and orientation data to a co-presence client application executing on an external computing system such as user computer system 160.

In some embodiments, HMD 200 can include a camera 280 to capture still and moving images. The images captured by camera 280 may be used to help track a physical position of the user and/or the handheld electronic device 202 in the real world, or physical environment relative to the virtual environment and/or can be displayed to the user in a pass through mode, allowing the user to temporarily leave the virtual environment and return to the physical environment without removing HMD 200 or otherwise changing the configuration of HMD 200.

In some embodiments, HMD 200 can include gaze tracking device 265 to detect and track an eye gaze of the user. Gaze tracking device 265 can include, for example, image sensor 265A, or multiple image sensors 265A, to capture images of the user's eyes, for example, a particular portion of the user's eyes, such as, for example, the pupil, to detect, and track direction and movement of, the user's gaze. In some implementations, HMD 200 may be configured so that the detected gaze is processed as a user input to be translated into a corresponding interaction in the co-presence virtual environment.

FIGS. 3A-3D illustrate example renderings of co-presence virtual environment 300 generated by a VR user device consistent with disclosed embodiments and are provided as non-limiting examples of the disclosed embodiments in operation. Co-presence virtual environment 300 could be rendered, for example, by VR user devices 135, 155 and displayed, respectively, on touchscreen display 144 or display 169. FIGS. 3A-3D are described below with reference to VR user devices 135, 155, VR server 110 and their associated components for explanatory purposes only and any functionality or operation described as being performed by VR user devices 135, 155, VR server 110, and their associated components is non-limiting.

Figure 3A:
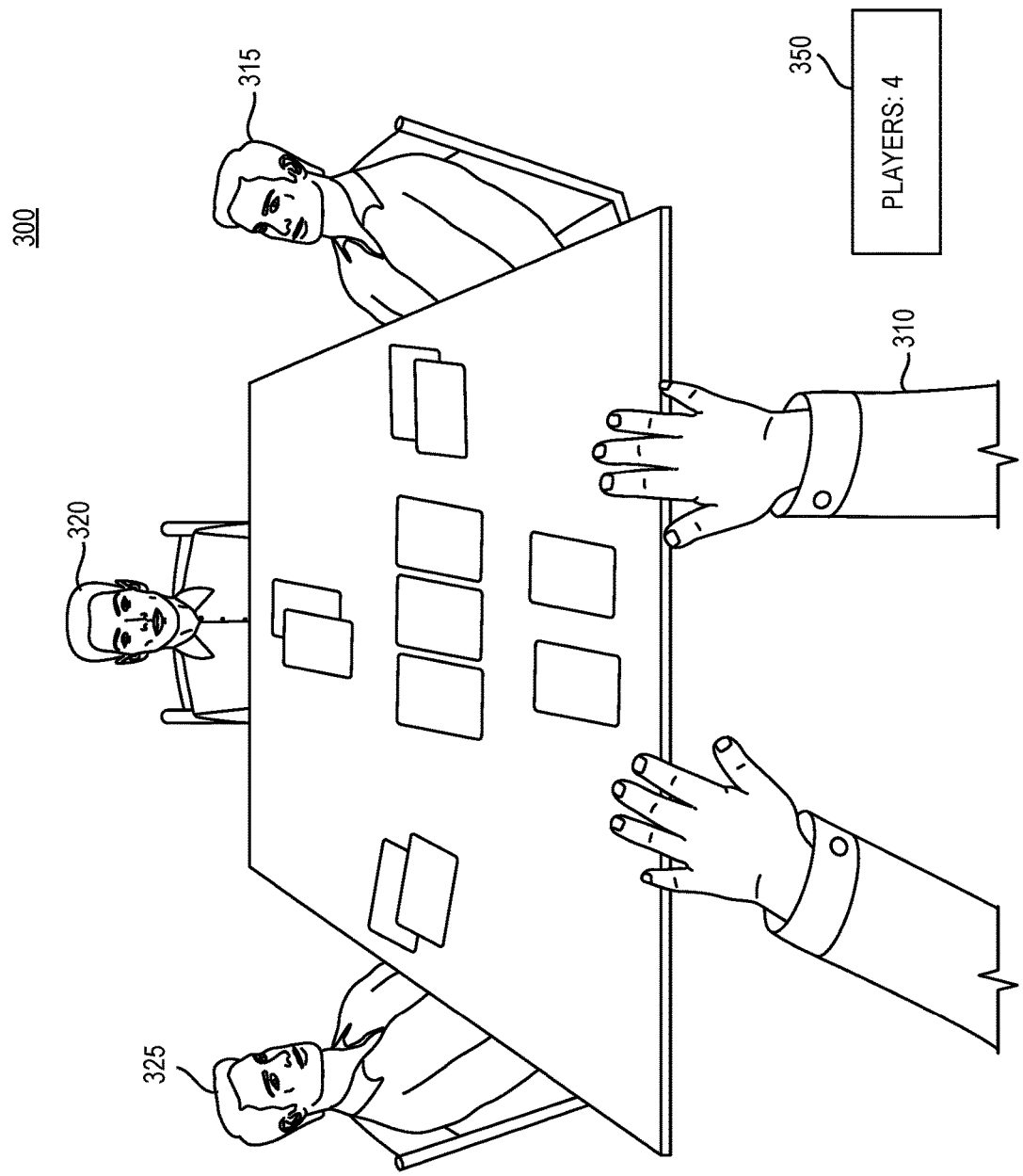
FIG. 3A shows an example co-presence virtual environment consistent with disclosed embodiments.

FIG. 3A illustrates a rendering of co-presence virtual environment 300 for playing a virtual card game. FIG. 3A shows co-presence virtual environment 300 as rendered by VR user device 135 (e.g., as rendered by co-presence client application 143 based on instructions received from VR server 110) operated by user 130 to control avatar 310. As shown in FIG. 3A, three other avatars, avatar 315, avatar 320, and avatar 325 are in co-presence virtual environment 300. In the following operational example, avatar 315 can be controlled by user 150 by operating VR user device 155. As shown in FIG. 3A, while avatar 310 is seated at the card table (in chair 385 of FIGS. 3C and 3D which is not visible from this perspective), VR user device 135 renders co-presence virtual environment 300 in a manner consistent with the intended use and operation of co-presence virtual environment 300. For example, VR user device 135 can render co-presence virtual environment 300 in color and generate an audio stream including sounds such as card shuffling, voices of avatar 315, avatar 320, and/or avatar 325, ambient noise, or sounds corresponding to alerts in the virtual card game. Also, while avatar 310 is seated, user 130 can participate in the virtual card game and co-presence virtual environment 300 by, for example, looking around, viewing his cards, folding his cards, or conversing with avatars 315, 320, and 325.

According to some embodiments, the rendering of co-presence virtual environment 300 can include notification overlay 350. Notification overlay 350 can display, for example, the number of active players in the virtual card game, the number of observers of the virtual card game, or the number of players that have become inactive by, for example, by entering their respective restricted space. In the embodiment of FIG. 3A, notification overlay 350 displays that there are four players actively participating in the virtual card game of co-presence virtual environment 300.

Figure 3B:
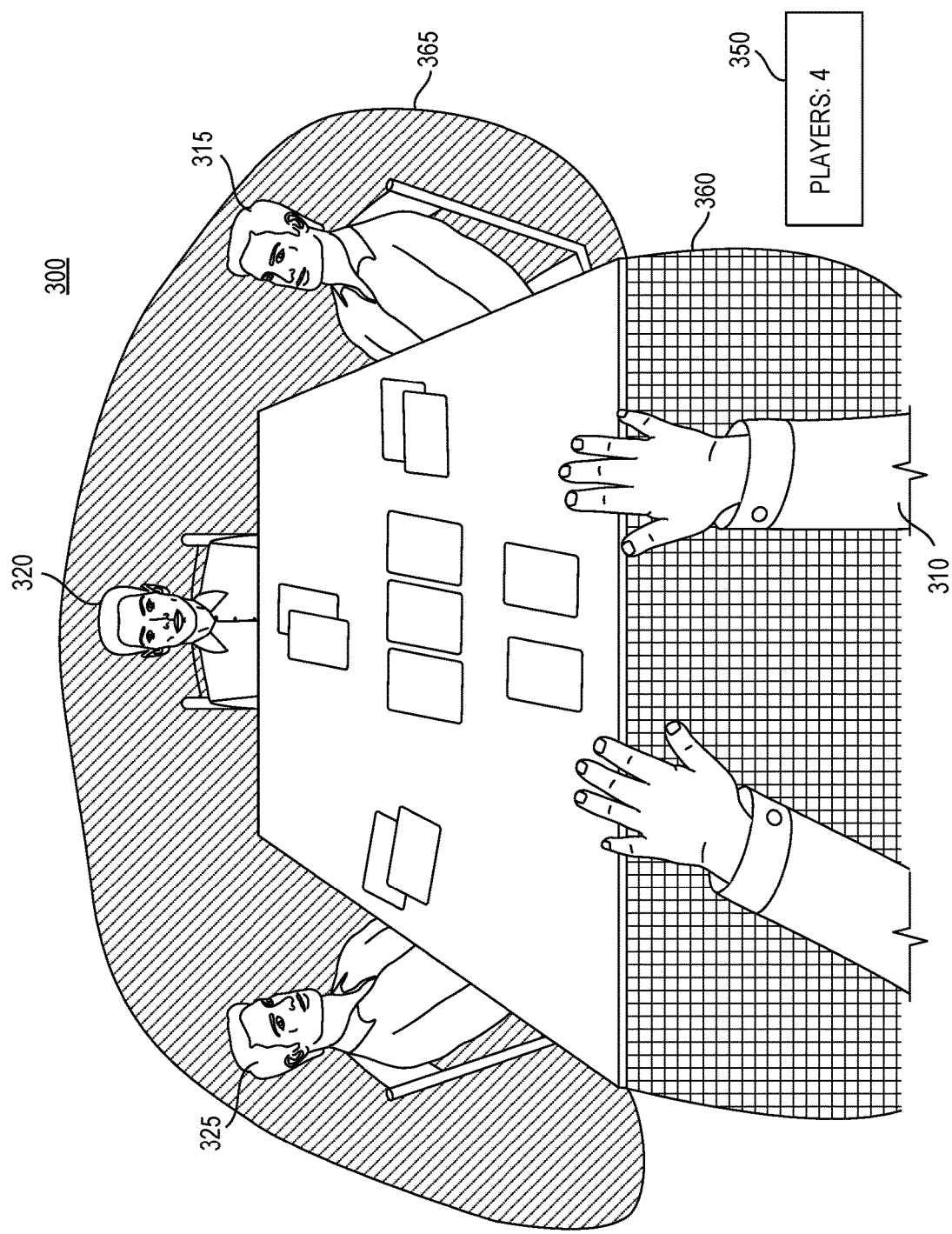
FIG. 3B shows another example co-presence virtual environment consistent with disclosed embodiments.

FIG. 3B illustrates region 360 and region 365 within co-presence virtual environment 300. In the example implementation of FIG. 3B, region 360 represents permitted space where avatar 310 can participate in co-presence virtual environment 300. Region 360 may be defined, for example, as the region falling within 2 m of chair 385 (of FIGS. 3C and 3D which is not visible from this perspective), or the side of the table where chair 385 is located. Region 365 represents restricted space for avatar 310, and can be defined for co-presence virtual environment 300 as the set of points within co-presence virtual environment 300 except for the points falling within region 360.

Consistent with disclosed embodiments, should user 130 control avatar 310 to enter region 365, co-presence manager 120 may send VR user device 135 co-presence virtual environment modification data that includes instructions to change its rendering of co-presence virtual environment 300. The co-presence virtual environment modification data can also include instructions to disable functions related to avatar 310's participation in the virtual card game, such as the ability to handle cards, converse with other avatars, or earn credits or points.

FIG. 3C illustrates an example rendering of co-presence virtual environment 300 as rendered by VR user device 135 from the perspective of the user controlling avatar 310. As shown in FIG. 3C, user 130 has controlled avatar 310 to move into restricted space (e.g., region 365). When user 130 controls VR user device 135 to move avatar 310, VR user device 135 can communicate user position data to co-presence manager 120. Co-presence manager 120 may compare the current position of avatar 310 to its restricted spaces, and when it detects that avatar 310 has moved into region 365, co-presence manager 120 can send co-presence virtual environment modification data to VR user device 135 instructing VR user device 135 to change the way it renders co-presence virtual environment 300. If any portion of the avatar 310 is within the region 365 (including, but not limited to, a head, hand, arm, torso, leg, foot, and/or any other portion of the avatar 310), the VR user device 135 can change the way it renders co-presence virtual environment 300. For example, VR user device 135 can render co-presence virtual environment 300 in a different color scheme, in black-and-white or in outline form. The co-presence virtual environment modification data can also include instructions for VR user device 135 to modify the audio it generates for co-presence virtual environment 300. For example, VR user device 135 may mute, muffle, or distort the audio it generates based on the co-presence virtual environment modification data.

According to some embodiments, the co-presence virtual environment modification data can include instructions for VR user device 135 to generate notification overlay 380 showing the permitted space for avatar 310. For example, FIG. 3C shows notification overlay 380 which indicates the area of co-presence virtual environment 300 the avatar must return so that co-presence virtual environment 300 returns to its default or normal state, for example, color and undistorted audio. In some embodiments, the co-presence virtual environment modification data can include instructions for VR user device 135 to generate a notification overlay displaying instructions informing the user of one or more actions the user may take to return to permitted space, such as notification overlays 370, 375.

In some embodiments, the co-presence virtual environment modification data can include instructions for VR user device 135 to update notification overlays. For example, as shown in FIG. 3C, VR user device 135 updated its rendering of co-presence virtual environment 300 to include an update to notification overlay 350 showing that once avatar 310 entered restricted space (e.g., region 365), there are three active players in the virtual card game and one invisible viewer that is not playing the virtual card game. In some embodiments, notification overlay 350 may display information informing user 130 that he is one of the invisible viewers.

FIG. 3D illustrates a rendering of co-presence virtual environment 300 by VR user device 155—the VR user device associated with avatar 315—when avatar 310 enters restricted space. In rendering of co-presence virtual environment 300 by VR user device 155, avatar 310 is no longer visible. The rendering can also include notification overlay 390 providing information that one player has left the virtual card table and is no longer an active participant in the virtual card game. VR user device 155 may also update notification overlay 350 to show that there is one invisible viewer not playing the game and that they are still three active players. VR user device 155 may render co-presence virtual environment 300 based on co-presence virtual environment modification data generated by co-presence manager 120 responsive to co-presence manager 120 determining that avatar 310 has entered restricted space. Further, in the event that avatar 310 returns to its permitted space region 360, VR user device 155 may receive co-presence virtual environment modification data instructing VR user device 155 to render avatar 310 as visible.

Figure 4:
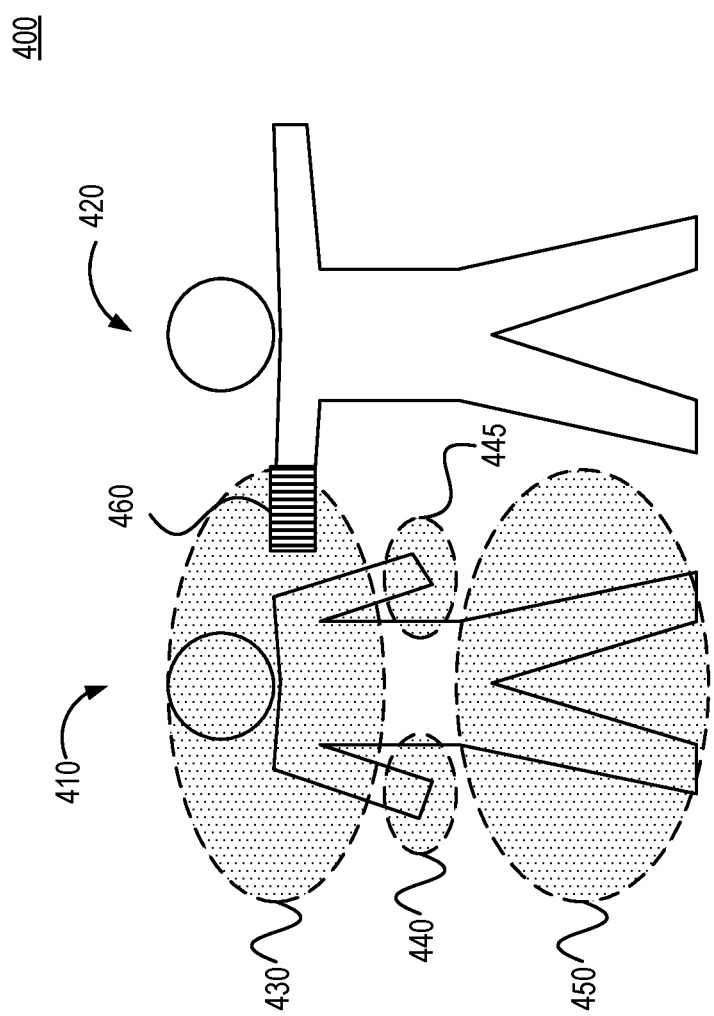
FIG. 4 shows another example co-presence virtual environment consistent with disclosed embodiments.

FIG. 4 illustrates one embodiment of co-presence virtual environment 400 rendered by a VR user device operated by a user that is not controlling avatar 410 or avatar 420. Co-presence virtual environment 400 can be a virtual environment where users' avatars are free to move about the virtual environment space and interact with other avatars within the virtual environment, such as a dance game, dance application, or business networking application.

In the illustrated embodiment of FIG. 4, the user controlling avatar 410 has defined safe spaces 430, 440, 445, and 450. The user controlling avatar 410 has defined safe spaces 430, 440, 445, and 450 to be different sizes. For example, safe space 430—corresponding to the head and shoulder region of avatar 410—is larger than safe spaces 440 and 445, which correspond to the hands of avatar 410. In addition, the user of avatar 410 has defined a large safe space 450 corresponding to the waist down of avatar 410. In some embodiments, VR users devices associated with users participating in co-presence virtual environment may render the shaded regions illustrated in FIG. 4 corresponding to safe spaces 430, 440, 445, and 450 may be as overlays on co-presence virtual environment 400, while in other embodiments, VR users devices associated with users participating in co-presence virtual environment may not render them. According to some embodiments, the visibility of one or more of safe spaces 430, 440, 445, and 450 can be turned on or off by the user that defined them, or by the other users participating in co-presence virtual environment 400.

In the embodiment of FIG. 4, avatar 420 has approached avatar 410 and portion 460 of its arm has entered safe space 430. As a result, the VR user device rendering co-presence virtual environment 400 has received co-presence virtual environment modification data instructing the VR user device to render portion 460 of avatar 420 as invisible. In some embodiments, the co-presence virtual environment modification data can instruct the VR user device to render portion 460 in outline, render portion 460 as translucent, or render portion 460 using a different color scheme, such as black-and-white. In some embodiments, the co-presence virtual environment modification data can instruct the VR user device to render all of avatar 420 as invisible, in outline, translucent, or using a different color scheme when portion 460 has entered safe space 430.

There may be some applications where users do not want to have their safe spaces turned on. For example, a co-presence virtual environment can include a simulated boxing match. In such an embodiment, users may want to turn off their safe spaces because contact between avatars would be necessary for a boxing match. Accordingly, the disclosed embodiments may allow users to selectively turn off their safe spaces in certain situations. For example, VR user devices may generate a user interface that includes safe space preference settings. Using the user interface, the user can adjust the size of their safe spaces or disable one or all them for a particular application. After safe space preferences are modified, the VR user device can communicate the safe space preferences information to the co-presence manager.

Figure 5:
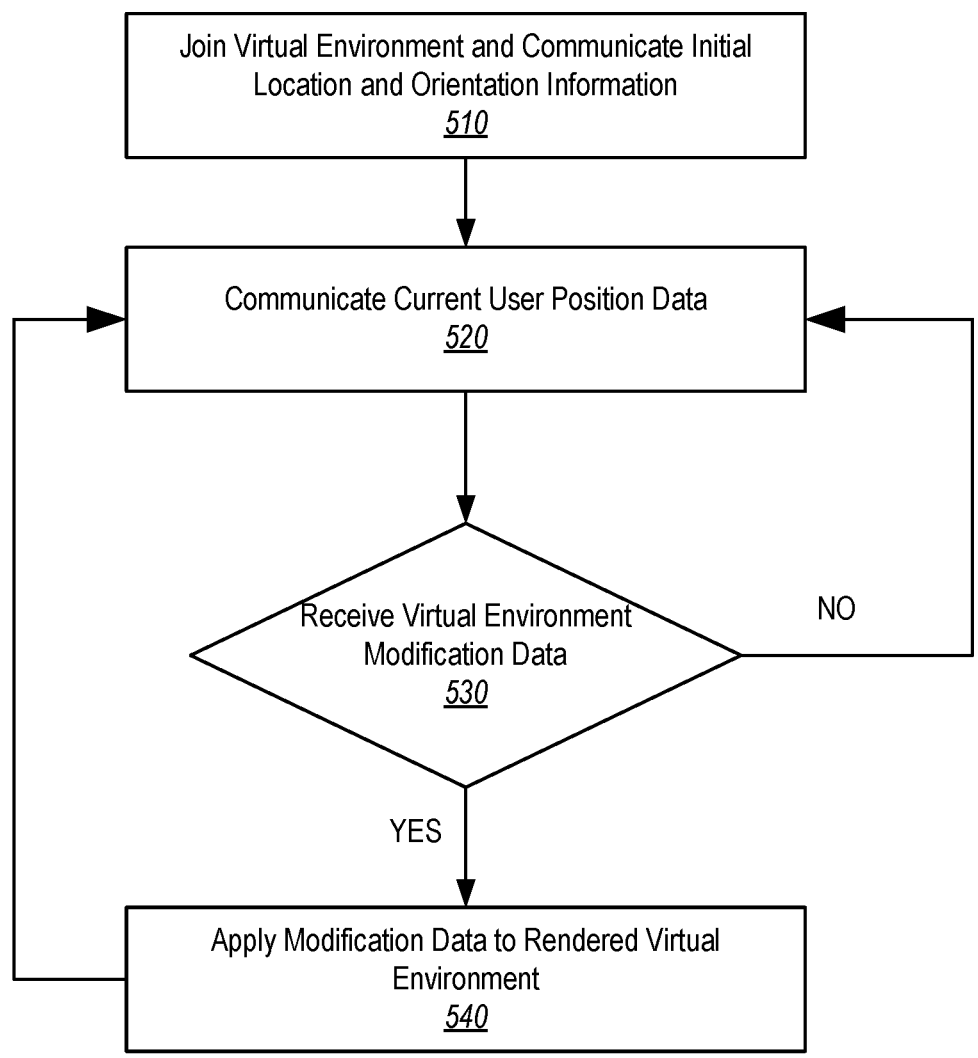
FIG. 5 shows a flow chart for a process for rendering a co-presence virtual environment.

FIG. 5 shows a flowchart representing an example process 500 for rendering a co-presence virtual environment. According to some embodiments, process 500 can be performed by one or more components of a VR user device. For example, process 500 can be performed by co-presence client application 143, 162. Although the following discussion below describes process 500 as being performed by a co-presence client application, other components of a computer system configured to generate virtual environments can perform process 500 without departing from the spirit and scope of the present disclosure.

Process 500 begins at step 510 where a co-presence client application sends a communication to a VR server hosting one or more virtual reality applications requesting to join a co-presence virtual environment associated with one of the virtual-reality applications. The request to join the co-presence virtual environment can include initial location and orientation information of a VR user device. For example, in some embodiments the initial location and orientation information can include the position information of a HMD worn by user operating a VR user device. In some embodiments, co-presence client application sets the initial location and orientation information to zero, and any later movements of the VR user device, such as changing the position of VR user device's HMD, will be described relative to zero.

In some embodiments, after co-presence client application sends a communication to join a co-presence virtual environment, it may receive a data object describing the position of an avatar (corresponding to the user operating the VR user device) within the co-presence virtual environment from the VR server. Using the data object, the co-presence client application may send additional user position data in the format of the data object when it detects a change in the location or orientation of the VR user device.

Once the co-presence client application joins the co-presence virtual environment, it may communicate with a sensing system or a HMD system of the VR user device to detect when the location or orientation of the VR user device (or its HMD) has changed. When the location and orientation of the VR user device changes, co-presence client application, at step 520, can communicate current user position data to the VR server. The current user position data can include the relative change in orientation or position from the initial location and orientation of the VR user device. In some embodiments, as described above user position data can include a data object describing the user's position within the co-presence virtual environment. In such embodiments, the data object may be manipulated using sensor data obtained from the sensing system or the HMD system of the VR user device. The co-presence client application may perform step 520 continuously as a user controls their avatar in the co-presence virtual environment (step 530: NO) so that the VR server is continuously updated regarding the location an orientation of the user.

While the VR user device renders the co-presence virtual environment, the co-presence client application may receive co-presence virtual environment modification data (step 530: YES). As discussed above, co-presence virtual environment modification data can include instructions for modifying how co-presence client application renders co-presence virtual environment on the VR user device. For example, the co-presence virtual environment modification data can provide instructions to change the color scheme of the co-presence virtual environment, change the edges of objects within the co-presence virtual environment (for example, making edges dashed lines as opposed to solid lines), change the size of objects or avatars within the co-presence virtual environment, or change the visibility or transparency of one or more avatars in the co-presence virtual environment.

According to some embodiments, the co-presence virtual environment modification data may include instructions for co-presence client application to render an alternative co-presence virtual environment and relocate the user's avatar to a location within the alternative co-presence virtual environment. For example, the co-presence virtual environment modification data may include instructions to render an empty room instead of a game room.

The co-presence of virtual environment modification data can also include instructions to render one or more notification overlays that are superimposed on the co-presence virtual environment rendered by the VR user device. The notification overlays can include, for example, an outline or highlight of a region informing the user of the VR user device where to move her avatar, information regarding the number of visible avatars within the co-presence virtual environment, or information regarding the number of invisible avatars within the co-presence virtual environment whose corresponding users can view the co-presence virtual environment. Notification overlays can also include text descriptions providing instructions to the user operating VR user device for viewing the co-presence virtual environment.

Once the client application receives the co-presence virtual environment modification data, it may apply that modification data to the rendered co-presence virtual environment at step 540. Once it renders the co-presence virtual environment according to the modification data, process 500 may return to step 520 where it will continuously communicate current user position data to the VR server.

Figure 6:
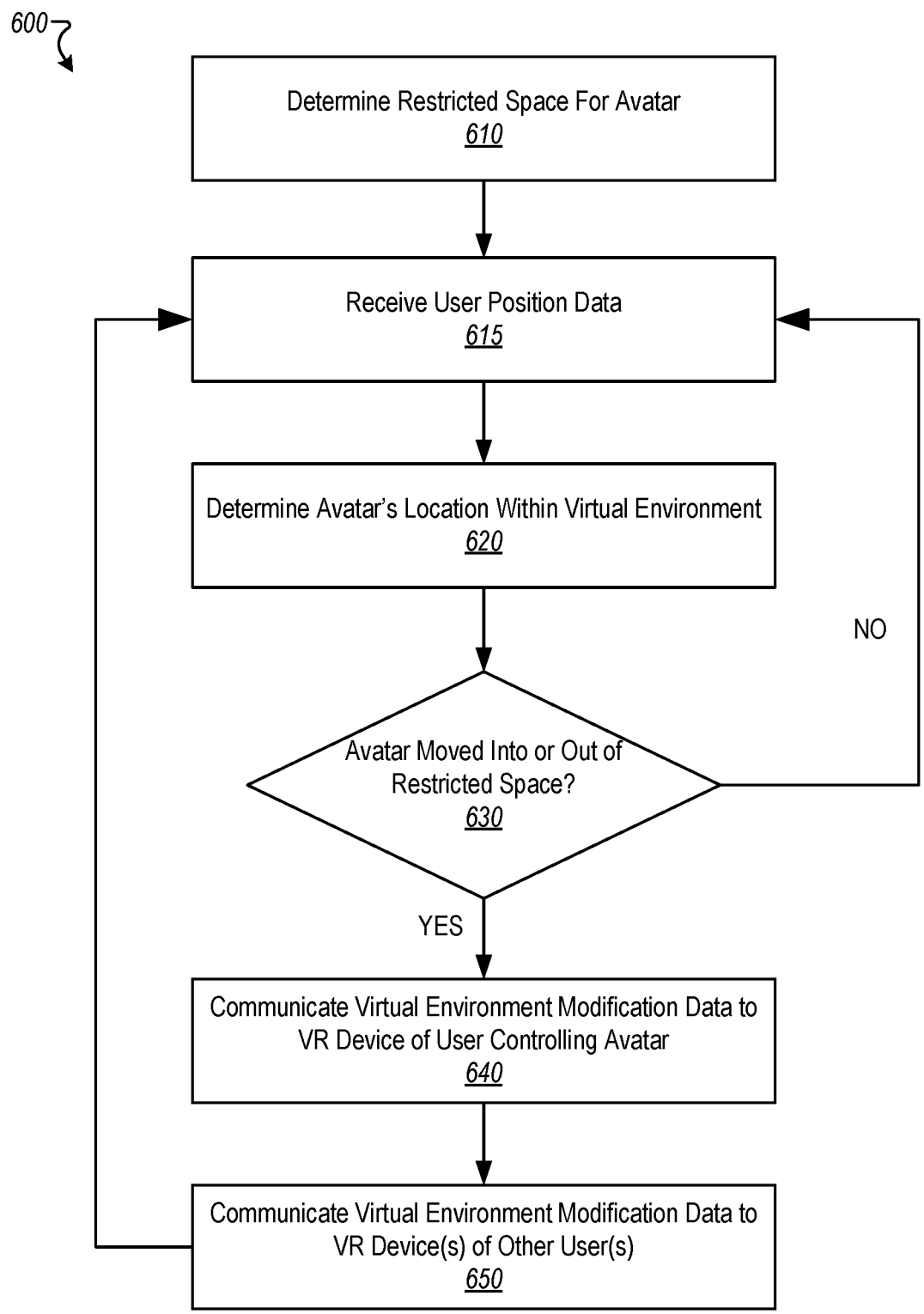
FIG. 6 shows a flow chart for a process for controlling a co-presence virtual environment for a first user and a second user.

FIG. 6 shows a flowchart representing an example process 600 for controlling a co-presence virtual environment experienced by at least a first user and a second user. According to some embodiments, process 600 can be performed by one or more components of a VR server. For example, process 600 can be performed by co-presence manager 120. In some embodiments, process 600 can be performed by one or more components a VR user device. For example, process 600 can be performed by co-presence manager 121 or 122. Although the following discussion describes process 600 as being preformed by a co-presence manager, other components of a computer system configured to generate or manage virtual environments can perform process 600 without departing from the spirit and scope of the present disclosure.

According to some embodiments, a co-presence manager begins process 600 at step 610 where the co-presence manager determines restricted spaces for the avatars in the co-presence virtual environment. Consistent with disclosed embodiments, restricted spaces for an avatar can include a set of three-dimensional points within a co-presence virtual environment that the avatar cannot occupy, encroach or enter. Restricted spaces can be defined using multiple criteria. For example, restricted spaces can be include the set of points within a radius of an object in the co-presence virtual environment, by safe spaces defined by of other users in the co-presence virtual environments, the set of points for which an avatar is allowed to occupy (e.g., a permitted space) or a combination of these. Restricted spaces can also be defined based on the context of the co-presence virtual environment. A context can be defined, broadly or narrowly depending on the implementation, based on what the co-presence virtual environment is, on the nature of the avatar(s) in the co-presence virtual environment, and/or on the characteristics of one or more activities capable of being performed in the co-presence virtual environment, to name just a few illustrative examples. For example, a user can define a first set of safe spaces for a first co-presence virtual environment application (e.g., the context can then be a table game) and a second set of safe spaces for a second co-presence virtual environment application (e.g., the context can then be a dancing experience). In the first example, the restricted space can be defined, in some implementations, based on a notion of what amount of space around a participant in a table game should be reserved for that participant. In the second example, the restricted space can be defined, in some implementations, based on a notion of what amount of space around a participant in a dancing experience should be reserved for that participant. Accordingly, the restricted space for particular avatar can vary depending on the application for the co-presence virtual environment.

At step 615, the co-presence manager receives user position data. According to some embodiments, the user position data can be received from one or more VR user devices operated by users participating in the co-presence virtual environment. User position data can include a relative location and orientation of the user with respect to an initial position, or the location and orientation of the user when the user's VR user device requested to join the co-presence virtual environment. In some embodiments, the co-presence manager receives user position data by obtaining it from a sensing system of a VR user device, or from sensors deployed within the user's HMD. In such embodiments, the co-presence manager can use sensor data obtained from the sensors and correlate it to avatar movement within the co-presence virtual environment. After the co-presence manager receives user position data, it can determine the avatar's position within the co-presence virtual environment at step 620.

If the co-presence manager determines that the avatar is in its permitted space, that is, it has not entered restricted space (step 630: NO), it does nothing until receiving additional user position data at step 615. But, if the computing system detects that the avatar has moved into restricted space (step 630: YES), then the computing system performs step 640 and 650 of process 600 where it provides instructions for modifying the co-presence virtual environment via co-presence virtual environment modification data.

At step 640, co-presence manager communicates co-presence virtual environment modification data to the VR user device of the user controlling the avatar that entered restricted space. The co-presence virtual environment modification data can provide instructions to modify the co-presence virtual environment in a manner that may indicate to the user experiencing the co-presence virtual environment that they have entered restricted space. For example, co-presence virtual environment modification data can include instructions to render the co-presence virtual environment as black-and-white as opposed to color. Consistent with disclosed embodiments, the co-presence virtual environment modification data can also include instructions to render one or more notification overlays providing information to the user that its avatar has moved into restricted space. Such notification overlays can include signs, arrows, text boxes including instructions on how to return to permitted space, or indicators, such as highlighting, outlining, or color changes, showing what space the avatar is permitted to occupy within the co-presence virtual environment. The co-presence virtual environment modification data can also include instructions to disable avatar actions. For example, the co-presence virtual environment modification data can include instructions for the VR user device to disable movement within the co-presence virtual environment, disable the ability of the user to take part in activities (such as playing a game) in the co-presence virtual environment, or communicate with the other avatars in the co-presence virtual environment.

In some embodiments, the co-presence virtual environment modification data can include instructions to change the location of the avatar that entered restricted space. For example, the co-presence virtual environment modification data can include instructions for the VR user device (or the client co-presence application executed by it) to generate an alternate virtual environment and place the user's avatar in the alternate virtual environment. In some embodiments, the co-presence virtual environment modification data can include instructions to move the avatar from the restricted space to a point within permitted space or a designated starting point within the co-presence virtual environment. For example, in a co-presence virtual environment for a virtual card game, when an avatar leaves its chair and attempts to go behind another player, the co-presence virtual environment modification data can include instructions to automatically remove the avatar from its current position—behind the other player—and return it to its chair at the card table—where the avatar started when it joined the virtual environment.

At step 650, co-presence manager communicates co-presence virtual environment modification data to the one or more VR user devices operated by the other users experiencing the co-presence virtual environment. In some embodiments, the co-presence virtual environment modification data can provide instructions to modify the co-presence virtual environment experienced by the other users in a manner indicating to them that an avatar has entered restricted space. For example, the co-presence virtual environment modification data can provide instructions to render the co-presence virtual environment so that the appearance of the avatar or a portion of the avatar, that entered restricted space changes. For example, the avatar may become invisible or disappear, appear translucent, appear in a different color, appear as an outline, or appear frozen.

After the co-presence manager communicates co-presence virtual environment modification data to the VR users devices of the users experiencing the co-presence virtual environment, process 600 returns to step 615 until co-presence manager receives updated user position data. When co-presence manager receives updated user position data and determines that the user has moved its avatar out of restricted space (step 630: YES), then co-presence manager performs steps 640 and 650 to communicate co-presence virtual environment modification data including instructions to restore the co-presence virtual environments rendered by the VR user devices to their respective states prior to the user entering restricted space.

Figure 7:
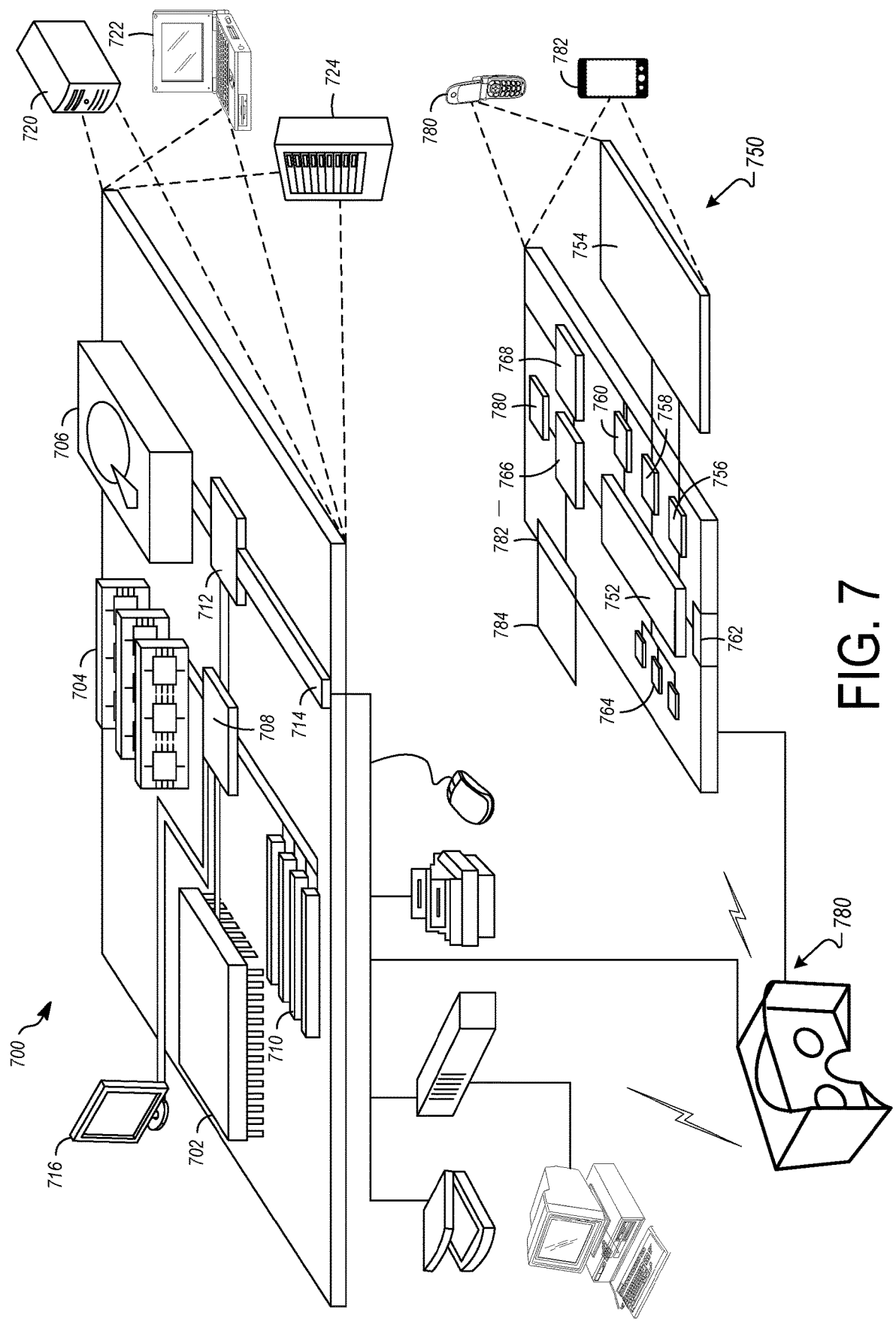
FIG. 7 shows an example of a computer device and a mobile computer device consistent with disclosed embodiments.

FIG. 7 shows an example of a computer device 700 and a mobile computer device 750, consistent with disclosed embodiments. Computing device 700 can include a processor 702, memory 704, a storage device 706, a high-speed interface 708 connecting to memory 704 and high-speed expansion ports 710, and a low speed interface 712 connecting to low speed bus 714 and storage device 706. Components 702, 704, 706, 708, 710, and 712, are interconnected using various busses, and can be mounted on a common motherboard or in other manners as appropriate. Processor 702 can process instructions for execution within the computing device 700, including instructions stored in the memory 704 or on storage device 706 to display graphical information for a GUI on an external input/output device, such as display 716 coupled to high speed interface 708. In some embodiments, multiple processors and/or multiple buses can be used, as appropriate, along with multiple memories and types of memory. In addition, multiple computing devices 700 can be connected, with each device providing portions of the necessary operations (e.g., as a server bank, a group of blade servers, or a multi-processor system).

Memory 704 stores information within computing device 700. In one embodiment, memory 704 is a volatile memory unit or units. In another embodiment, memory 704 is a non-volatile memory unit or units. Memory 704 may also be another form of computer-readable medium, such as a magnetic or optical disk.

Storage device 706 is capable of providing mass storage for the computing device 700. In one embodiment, storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 704, storage device 706, or memory on processor 702.

High speed controller 708 manages bandwidth-intensive operations for computing device 700, while low speed controller 712 manages lower bandwidth-intensive operations. Such allocation of functions is exemplary only. In one embodiment, high-speed controller 708 is coupled to memory 704, display 716 (e.g., through a graphics processor or accelerator), and to high-speed expansion ports 710, which may accept various expansion cards (not shown). Low-speed controller 712 can be coupled to storage device 706 and low-speed expansion port 714. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices may contain one or more of computing device 700, 750, and an entire system may be made up of multiple computing devices 700, 750 communicating with each other.

Computing device 750 includes processor 752, memory 764, an input/output device such as display 754, communication interface 766, and transceiver 768, among other components. Device 750 may also be provided with a storage device, such as a microdrive or other device, to provide additional storage. Each of components 750, 752, 764, 754, 766, and 768, are interconnected using various buses, and several of the components may be mounted on a common motherboard or in other manners as appropriate.

Processor 752 can execute instructions within the computing device 750, including instructions stored in memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to display 754. Display 754 may be, for example, a TFT LCD (Thin-Film-Transistor Liquid Crystal Display) or an OLED (Organic Light Emitting Diode) display, or other appropriate display technology. Display interface 756 may comprise appropriate circuitry for driving display 754 to present graphical and other information to a user. Control interface 758 may receive commands from a user and convert them for submission to processor 752. In addition, external interface 762 may communicate with processor 752, so as to enable near area communication of device 750 with other devices. External interface 762 can provide, for example, for wired or wireless communication in some embodiments multiple interfaces can be used.

Memory 764 stores information within computing device 750. Memory 764 can be implemented as one or more of a computer-readable medium or media, a volatile memory unit or units, or a non-volatile memory unit or units. Expansion memory 784 may also be provided and connected to device 750 through expansion interface 782, which may include, for example, a SIMM (Single In Line Memory Module) card interface. Such expansion memory 784 may provide extra storage space for device 750, or may also store applications or other information for device 750. Specifically, expansion memory 784 may include instructions to carry out or supplement the processes described above, and may include secure information also. Thus, for example, expansion memory 784 can be a security module for device 750, and can be programmed with instructions that permit secure use of device 750. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 764, expansion memory 784, or memory on processor 752 that may be received, for example, over transceiver 768 or external interface 762.

Device 750 can communicate wirelessly through communication interface 766, which can include digital signal processing circuitry where necessary. Communication interface 766 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 780 can provide additional navigation- and location-related wireless data to device 750, which can be used as appropriate by applications running on device 750.

Device 750 can also communicate audibly using audio codec 760, which may receive spoken information from a user and convert it to usable digital information. Audio codec 760 may likewise generate audible sounds for a user, such as through a speaker, e.g., in a handset of device 750. Such sound can include sound from voice telephone calls, can include recorded sound (e.g., voice messages, music files, etc.) and can also include sound generated by applications operating on device 750.

Computing device 750 can be implemented in a number of different forms, as shown in the figure. For example, it can be implemented as cellular telephone 780. It can also be implemented as part of smart phone 782, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 7 can include sensors that interface with a virtual reality headset (VR headset/HMD device 790). For example, one or more sensors included on computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. Computing device 750 can use the sensors to determine an absolute position and/or a detected rotation of the computing device in the VR space that can then be used as input to the VR space. For example, computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some embodiments, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some embodiments, one or more output devices included on the computing device 750 can provide output and/or feedback to a user of the VR headset 790 in the VR space. The output and feedback can be visual, tactical, or audio. The output and/or feedback can include, but is not limited to, rendering the VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 750 can be placed within VR headset 790 to create a VR system. VR headset 790 can include one or more positioning elements that allow for the placement of computing device 750, such as smart phone 782, in the appropriate position within VR headset 790. In such embodiments, the display of smart phone 782 can render stereoscopic images representing the VR space or virtual environment.

In some embodiments, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the VR space. As just one example, computing device can be a laser pointer. In such an example, computing device 750 appears as a virtual laser pointer in the computer-generated, 3D environment. As the user manipulates computing device 750, the user in the VR space sees movement of the laser pointer. The user receives feedback from interactions with the computing device 750 in the VR environment on the computing device 750 or on the VR headset 790.

In some embodiments, a computing device 750 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

A number of embodiments have been described. Nevertheless, it will be understood that various modifications may be made without departing from the spirit and scope of the specification.

Further implementations are summarized in the following examples:

Example 1

A method for controlling a co-presence virtual environment, the method comprising determining a first avatar's restricted space in the co-presence virtual environment, the first avatar corresponding to a first user of the co-presence virtual environment; receiving user position data from a first computing device associated with the first user and determining the first avatar's location within the co-presence virtual environment; and determining that the first avatar's location is within the first avatar's restricted space, and communicating, in response to the determination, first co-presence virtual environment modification data to the first computing device.

Example 2

The method of example 1, further comprising communicating, in response to the determination, second co-presence virtual environment modification data to a second computing device associated with a second user of the co-presence virtual environment.

Example 3

The method of example 2, wherein the first co-presence virtual environment modification data is different from the second co-presence virtual environment modification data.

Example 4

The method of examples 2 or 3, wherein the first avatar's restricted space is defined based on a safe space that has been defined by the second user.

Example 5

The method of any one of examples 2 to 4, wherein the second co-presence virtual environment modification data includes instructions for the second computing device to make at least a portion of the first avatar invisible in a rendering of the co-presence virtual environment by the second computing device.

Example 6

The method of any one of examples 2 to 5, wherein the second co-presence virtual environment modification data includes instructions to mute audio of the first avatar in an audio stream associated with the co-presence virtual environment generated by the second computing device.

Example 7

The method of any one of examples 1 to 6, wherein the first avatar's restricted space is defined based on a context of the co-presence virtual environment.

Example 8

The method of any one of examples 1 to 7, wherein the first avatar's restricted space is defined based on a region within the co-presence virtual environment.

Example 9

The method of any one of examples 1 to 8, wherein the first co-presence virtual environment modification data includes instructions for the first computing device to change a color scheme of the co-presence virtual environment.

Example 10

The method of any one of examples 1 to 9, wherein the first co-presence virtual environment modification data includes instructions for the first computing device to change an audio stream associated with the co-presence virtual environment generated by the first computing device.

Example 11

The method of any one of examples 1 to 10, wherein the first co-presence virtual environment modification data includes instructions for generating graphic indicators that instruct the first user to remove the first avatar from the first avatar's restricted space.

Example 12

The method of any one of examples 1 to 11, wherein the first co-presence virtual environment modification data includes instructions for the first computing device to render a notification showing a quantity of other avatars not visible in the co-presence virtual environment and a quantity of other users for which co-presence virtual environment modification data is provided.

Example 13

The method of any one of examples 1 to 12, wherein based on the determination that the first avatar's location is within the first avatar's restricted space, the method further comprises repositioning the first avatar outside of the restricted space but within the co-presence virtual environment without receiving user position data indicating that the first user changed the location of the first avatar.

Example 14

The method of example 13, further comprising communicating updated location data to the first computing device reflecting the first avatar's location after repositioning.

Example 15

The method of any one of examples 1 to 14, wherein the first co-presence virtual environment modification data corresponds to removing the first avatar from the co-presence virtual environment in response to the determination.

Example 16

The method of example 15, wherein the first co-presence virtual environment modification data includes instructions for the first computing device to render an alternative virtual environment different from the co-presence virtual environment, and place the first avatar within the alternative virtual environment.

Example 17

A method for rendering a co-presence virtual environment, the method comprising: communicating a message requesting to join a co-presence virtual environment; communicating current user position data responsive to movement of a virtual reality user device, wherein the co-presence virtual environment includes an avatar associated with the virtual reality user device, and wherein a current position of the avatar is based on the current user position data; and receiving virtual environment modification data and applying the received virtual environment modification data to a rendering of the co-presence virtual environment associated with the virtual reality user device, the virtual environment modification data reflecting a determination that the current position of the avatar is within a restricted space for the avatar.

Example 18

The method of example 17, further comprising communicating initial user position data that includes initial location and orientation data of the virtual reality user device, and wherein the current user position data includes current location and orientation data of the virtual reality user device.

Example 19

The method of example 18, wherein the initial user position data includes the initial location data associated with an avatar participating in the co-presence virtual environment when the avatar joins the co-presence virtual environment, and wherein the current location data includes current location information associated with the avatar participating in the co-presence virtual environment.

Example 20

The method of any one of examples 17 to 19, wherein the virtual environment modification data includes instructions to modify a color of the co-presence virtual environment.

Example 21

The method of any one of examples 17 to 20, wherein the virtual environment modification data includes instructions to modify audio generated by the virtual reality user device while rendering the co-presence virtual environment.

Example 22

The method of any one of examples 17 to 21, wherein the virtual environment modification data includes instructions to make invisible at least a portion of the avatar within the co-presence virtual environment.

Example 23

The method of any one of examples 17 to 22, wherein the virtual environment modification data includes instructions for rendering a notification overlay on a rendering of the co-presence virtual environment, the notification overlay showing a quantity of avatars not visible in the co-presence virtual environment and a quantity of users having visual access to the co-presence virtual environment.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A method for controlling a co-presence virtual environment, the method comprising:
   determining a first avatar's restricted space in the co-presence virtual environment, the first avatar corresponding to a first user of the co-presence virtual environment;
   receiving user position data from a first computing device associated with the first user and determining the first avatar's location within the co-presence virtual environment; and
   determining that the first avatar's location is within the first avatar's restricted space, and communicating, in response to the determination, first co-presence virtual environment modification data to the first computing device, the first co-presence virtual environment modification data including instructions for the first computing device to render a notification indicating that at least one avatar is not visible in the co-presence virtual environment, the first co-presence virtual environment modification data further including instructions for rendering a notification overlay on a rendering of the co-presence virtual environment, the notification overlay indicating that at least one avatar is not visible in the co-presence virtual environment.

2. The method of claim 1, further comprising communicating, in response to the determination, second co-presence virtual environment modification data to a second computing device associated with a second user of the co-presence virtual environment.

3. The method of claim 2, wherein the first co-presence virtual environment modification data is different from the second co-presence virtual environment modification data.

4. The method of claim 2, wherein the first avatar's restricted space is defined based on a safe space that has been defined by the second user.

5. The method of claim 2, wherein the second co-presence virtual environment modification data includes instructions for the second computing device to make at least a portion of the first avatar invisible in a rendering of the co-presence virtual environment by the second computing device.

6. The method of claim 2, wherein the second co-presence virtual environment modification data includes instructions to mute audio of the first avatar in an audio stream associated with the co-presence virtual environment generated by the second computing device.

7. The method of claim 1, wherein the first avatar's restricted space is defined based on a context of the co-presence virtual environment.

8. The method of claim 1, wherein the first avatar's restricted space is defined based on a region within the co-presence virtual environment.

9. The method of claim 1, wherein the first co-presence virtual environment modification data includes instructions for the first computing device to change a color scheme of the co-presence virtual environment.

10. The method of claim 1, wherein the first co-presence virtual environment modification data includes instructions for the first computing device to change an audio stream associated with the co-presence virtual environment generated by the first computing device.

11. The method of claim 1, wherein the first co-presence virtual environment modification data includes instructions for generating graphic indicators that instruct the first user to remove the first avatar from the first avatar's restricted space.

12. The method of claim 1, wherein the notification further shows a quantity of other users for which co-presence virtual environment modification data is provided.

13. The method of claim 1, wherein based on the determination that the first avatar's location is within the first avatar's restricted space, the method further comprises repositioning the first avatar outside of the restricted space but within the co-presence virtual environment without receiving user position data indicating that the first user changed the location of the first avatar.

14. The method of claim 13, further comprising communicating updated location data to the first computing device reflecting the first avatar's location after repositioning.

15. The method of claim 1, wherein the first co-presence virtual environment modification data corresponds to removing the first avatar from the co-presence virtual environment in response to the determination.

16. The method of claim 15, wherein the first co-presence virtual environment modification data includes instructions for the first computing device to render an alternative virtual environment different from the co-presence virtual environment, and place the first avatar within the alternative virtual environment.

17. A method for rendering a co-presence virtual environment, the method comprising:
communicating a message requesting to join a co-presence virtual environment;
communicating current user position data responsive to movement of a virtual reality user device, wherein the co-presence virtual environment includes an avatar associated with the virtual reality user device, and wherein a current position of the avatar is based on the current user position data; and
receiving virtual environment modification data and applying the received virtual environment modification data to a rendering of the co-presence virtual environment associated with the virtual reality user device, the virtual environment modification data reflecting a determination that the current position of the avatar is within a restricted space for the avatar, the virtual environment modification data including instructions for rendering a notification overlay on a rendering of the co-presence virtual environment, the notification overlay indicating that at least one avatar is not visible in the co-presence virtual environment.

18. The method of claim 17, further comprising communicating initial user position data that includes initial location and orientation data of the virtual reality user device, and wherein the current user position data includes current location and orientation data of the virtual reality user device.

19. The method of claim 18, wherein the initial user position data includes the initial location data associated with an avatar participating in the co-presence virtual environment when the avatar joins the co-presence virtual environment, and wherein the current location data includes current location information associated with the avatar participating in the co-presence virtual environment.

20. The method of claim 17, wherein the virtual environment modification data includes instructions to modify a color of the co-presence virtual environment.

21. The method of claim 17, wherein the virtual environment modification data includes instructions to modify audio generated by the virtual reality user device while rendering the co-presence virtual environment.

22. The method of claim 17, wherein the virtual environment modification data includes instructions to make invisible at least a portion of the avatar within the co-presence virtual environment.

23. The method of claim 17, wherein the notification overlay further shows a quantity of users having visual access to the co-presence virtual environment.

24. A method for controlling a co-presence virtual environment, the method comprising:
determining a first avatar's restricted space in the co-presence virtual environment, the first avatar corresponding to a first user of the co-presence virtual environment;
receiving user position data from a first computing device associated with the first user and determining the first avatar's location within the co-presence virtual environment; and
determining that the first avatar's location is within the first avatar's restricted space, and communicating, in response to the determination, first co-presence virtual environment modification data to the first computing device, the first co-presence virtual environment modification data including instructions for the first computing device to render a notification indicating that co-presence virtual environment modification data is provided for at least one other user, wherein the notification further shows a quantity of other users for which co-presence virtual environment modification data is provided.

* * * * *

UNITED STATES PATENT AND TRADEMARK OFFICE
CERTIFICATE OF CORRECTION

PATENT NO. : 10,722,800 B2
APPLICATION NO. : 15/595369
DATED : July 28, 2020
INVENTOR(S) : Tilton et al.

Page 1 of 1

It is certified that error appears in the above-identified patent and that said Letters Patent is hereby corrected as shown below:

On the Title Page

Column 2, item [56], Line 1, delete "a.," and insert -- al., --, therefor.

Page 2, Column 2, item [56], Line 6, delete "Zinnan" and insert -- Ziman --, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*